United States Patent
Morita et al.

(10) Patent No.: US 10,005,165 B2
(45) Date of Patent: Jun. 26, 2018

(54) DEVICE AND METHOD OF CONTROLLING MACHINE TOOL, TO CONTROL SYNCHRONIZED OPERATION OF SPINDLE AXIS AND FEED AXIS

(71) Applicant: FANUC CORPORATION, Yamanashi (JP)

(72) Inventors: Yuuki Morita, Yamanashi (JP);
Daisuke Tajima, Yamanashi (JP);
Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 195 days.

(21) Appl. No.: 15/172,156

(22) Filed: Jun. 3, 2016

(65) Prior Publication Data

US 2016/0357171 A1     Dec. 8, 2016

(30) Foreign Application Priority Data

Jun. 4, 2015   (JP) .................................. 2015-113917

(51) Int. Cl.
*G05B 19/402*   (2006.01)
*B23Q 15/013*   (2006.01)
(Continued)

(52) U.S. Cl.
CPC ......... *B23Q 15/08* (2013.01); *G05B 19/4141* (2013.01); *B23G 1/18* (2013.01);
(Continued)

(58) Field of Classification Search
CPC ........ G05B 19/402; G05B 2219/49086; G05B 19/4141; G05B 2219/50218; B23G 1/18; B23Q 15/013; B23Q 15/08
(Continued)

(56) References Cited

U.S. PATENT DOCUMENTS 3,564,633 A * 2/1971 Stade ........................ B23G 1/16
                                                        408/3
4,879,660 A * 11/1989 Asakura ............... G05B 19/186
                                                        318/39
(Continued)

FOREIGN PATENT DOCUMENTS

CN        1172293 A     2/1998
CN      102179530 A     9/2011
(Continued)

*Primary Examiner* — Miranda M Huang
*Assistant Examiner* — Olvin Lopez Alvarez
(74) *Attorney, Agent, or Firm* — Hauptman Ham, LLP

(57) ABSTRACT

A controller for controlling a synchronized operation of spindle and feed axes. A spindle-axis control section includes an initial-motion control section for making a spindle axis perform an accelerated rotation at maximum capacity from a process start position; a maximum-acceleration detecting section for detecting a maximum acceleration of the spindle axis; a residual rotation-amount detecting section for detecting a residual rotation amount of the spindle axis; a current-speed detecting section for detecting a current speed of the spindle axis; a decelerating-motion control section for making the spindle axis perform a decelerated rotation at a gradually increasing deceleration so as to reach an intermediate rotation speed after the accelerated rotation; and a positioning-motion control section for making the spindle axis perform a decelerated rotation at maximum capacity so as to reach the target thread depth after reaching the intermediate rotation speed.

15 Claims, 10 Drawing Sheets

(51) Int. Cl.
  *B23Q 15/08* (2006.01)
  *B23G 1/18* (2006.01)
  *G05B 19/414* (2006.01)

(52) U.S. Cl.
  CPC .............. *G05B 2219/49086* (2013.01); *G05B 2219/50218* (2013.01)

(58) Field of Classification Search
  USPC ........................................................ 700/188
  See application file for complete search history.

(56) References Cited

U.S. PATENT DOCUMENTS

| | | | | |
|---|---|---|---|---|
| 5,010,286 A | * | 4/1991 | Nakamura | G05B 19/186 318/39 |
| 5,175,680 A | * | 12/1992 | Yoneda | G05B 19/182 318/625 |
| 5,184,053 A | * | 2/1993 | Maruo | G05B 19/186 318/39 |
| 5,307,549 A | * | 5/1994 | Tsutsumi | G05B 19/186 29/27 C |
| 6,008,609 A | * | 12/1999 | Sawashima | G05B 19/186 318/569 |
| 6,111,382 A | * | 8/2000 | Tsutsui | G05B 19/186 318/569 |
| 6,291,959 B1 | * | 9/2001 | Yoshida | G05B 19/404 318/567 |
| 6,647,353 B2 | * | 11/2003 | Fujibayashi | G05B 19/416 702/150 |
| 9,886,020 B2 | * | 2/2018 | Tezuka | G05B 19/182 |
| 2004/0128018 A1 | * | 7/2004 | Sugie | G05B 19/182 700/160 |
| 2006/0287758 A1 | * | 12/2006 | Geissdorfer | G05B 19/41 700/186 |
| 2007/0007926 A1 | * | 1/2007 | Iwashita | G05B 19/195 318/625 |
| 2007/0046677 A1 | * | 3/2007 | Hong | G05B 19/41 345/442 |
| 2009/0153092 A1 | * | 6/2009 | Hosokawa | G05B 19/19 318/591 |
| 2011/0088523 A1 | * | 4/2011 | Yamada | G05B 19/4141 82/1.11 |
| 2013/0204427 A1 | * | 8/2013 | Terada | G05B 19/19 700/192 |
| 2013/0226355 A1 | * | 8/2013 | Ueno | G05B 19/18 700/280 |
| 2013/0300337 A1 | * | 11/2013 | Nagaoka | G05B 19/416 318/671 |
| 2015/0081084 A1 | * | 3/2015 | Nishiwaki | B23G 1/16 700/170 |
| 2016/0291580 A1 | * | 10/2016 | Morita | G05B 19/416 |
| 2016/0357171 A1 | * | 12/2016 | Morita | G05B 19/4141 |
| 2017/0028490 A1 | * | 2/2017 | Morita | B23G 1/16 |
| 2017/0212502 A1 | * | 7/2017 | Morita | G05B 19/414 |
| 2017/0277160 A1 | * | 9/2017 | Morita | G05B 19/29 |

FOREIGN PATENT DOCUMENTS

| | | | |
|---|---|---|---|
| CN | 104380218 A | | 2/2015 |
| JP | 6-289922 A | | 10/1994 |
| JP | 2629729 B2 | | 7/1997 |
| JP | 10-76444 A | | 3/1998 |
| JP | 10100042 A | * 9/1998 | ............ B23Q 15/00 |
| JP | 2003-181722 A | | 7/2003 |
| JP | 3553741 B2 | | 8/2004 |
| JP | 2010-511919 A | | 4/2010 |

* cited by examiner

DEVICE AND METHOD OF CONTROLLING MACHINE TOOL, TO CONTROL SYNCHRONIZED OPERATION OF SPINDLE AXIS AND FEED AXIS

RELATED APPLICATIONS

The present application claims priority to Japanese Patent Application Number 2015-113917 filed Jun. 4, 2015, the disclosure of which is hereby incorporated by reference herein in its entirety.

BACKGROUND OF THE INVENTION

1. Field of the Invention

The present invention relates to a device of controlling a machine tool, to control a synchronized operation of a spindle axis and a feed axis. The present invention also relates to a method of controlling a machine tool, to control a synchronized operation of a spindle axis and a feed axis.

2. Description of the Related Art

In a machine tool capable of performing a tapping process by a synchronized operation of a spindle (or principal) axis and a feed axis, various kinds of configurations for improving processing accuracy and reducing cycle time have been proposed. For example, Japanese Patent No. 2629729 (JP2629729B) discloses a thread forming apparatus that performs a tapping process by operating a feed axis to follow the rotation of a spindle axis, in which a feed command value for the feed axis is computed based on the rotational speed and rotational acceleration of the spindle axis and a thread pitch, and the feed command value is corrected in accordance with the actual rotational position of the spindle axis, so as to improve tapping accuracy. On the other hand, Japanese Patent No. 3553741 (JP3553741B) discloses a method of acceleration and deceleration control of a spindle motor, executed by a numerical control unit that performs synchronization control of a spindle axis and a feed axis for a tapping process, in which the numerical control unit prepares an acceleration and deceleration command in conformity with the power characteristics of the spindle axis, and controls the spindle axis based on the acceleration and deceleration command to improve the response of the spindle axis, so as to reduce cycle time.

SUMMARY OF THE INVENTION

In a machine tool capable of performing a tapping process by a synchronized operation of a spindle axis and a feed axis, cycle time is generally determined depending on the acceleration capacity of the spindle axis. It is desirable to reduce cycle time by controlling the spindle axis so as to maximize the acceleration capacity thereof with a simple configuration, without performing a preliminary work requiring a high-level skill, such as a parameter setting or adjustment, etc., required for the numerical control unit to prepare acceleration and deceleration commands in conformity with the power characteristics of the spindle axis.

One aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position of the spindle axis. The numerical control section comprises a spindle-axis command outputting section configured to obtain, from the tapping program, a total rotation amount and a maximum rotation speed of the spindle axis during a period when the spindle axis operates from a process start position to a target thread depth, and to send the total rotation amount and the maximum rotation speed as the spindle-axis command to the spindle-axis control section. The spindle-axis control section comprises an initial-motion control section configured to make the spindle axis perform an accelerated rotation at maximum capacity from the process start position, by a velocity control in which the maximum rotation speed is set as a target value; a maximum-acceleration detecting section configured to detect a maximum acceleration of the spindle axis during the accelerated rotation at maximum capacity, based on the rotational position of the spindle axis; a residual rotation-amount detecting section configured to detect a residual rotation amount of the spindle axis during a period when the spindle axis operates from a current position to the target thread depth, based on the total rotation amount and the rotational position of the spindle axis; a current-speed detecting section configured to detect a current speed of the spindle axis based on the rotational position of the spindle axis; a decelerating-motion control section configured to make the spindle axis perform a decelerated rotation so as to reach a predetermined intermediate rotation speed, by a velocity control, after the accelerated rotation at maximum capacity; and a positioning-motion control section configured to make the spindle axis perform a decelerated rotation at maximum capacity so as to reach the target thread depth, by a position control, after the spindle axis reaches the intermediate rotation speed, based on the maximum acceleration, the residual rotation amount and the current speed. The decelerating-motion control section is configured to successively update a velocity command for the decelerated rotation by the velocity control with use of the residual rotation amount and the current speed, and to make the spindle axis perform the decelerated rotation by the successively updated velocity command so that the residual rotation amount at an instant when the spindle axis reaches the intermediate rotation speed becomes equal to a positioning rotation amount of the spindle axis required for the spindle axis to reach the target thread depth under the position control.

Another aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position. The numerical control section comprises a spindle-axis command outputting section configured to obtain, from the tapping program, a total return-rotation amount and a maximum return-rotation speed of the spindle axis during a period when the spindle axis operates from a target thread depth to a return completion position, and to send the total return-rotation amount and the maximum return-rotation speed as the spindle-axis command to the spindle-axis control section. The spindle-axis control section comprises an initial-motion control section configured to make the spindle axis perform an accelerated inverse rotation at maximum capacity from the target thread depth or from an initial return position at which the spindle axis has returned by a predetermined rotation number from the target thread depth, by a velocity control in which the maximum return-rotation speed is set as a target value; a maximum-acceleration detecting section configured to detect or obtain a maximum acceleration of inverse rotation of the spindle axis during a period when the spindle axis performs the accelerated inverse rotation from the target thread depth; a residual rotation-amount detecting section configured to detect a residual return-rotation amount of the spindle axis during a period when the spindle axis operates from a current position to the return completion position, based on the total return-rotation amount and the rotational position; a current-speed detecting section configured to detect a current speed of inverse rotation of the spindle axis based on the rotational position; a decelerating-motion control section configured to make the spindle axis perform a decelerated inverse rotation so as to reach a predetermined intermediate return-rotation speed, by a velocity control, after the accelerated inverse rotation at maximum capacity; and a positioning-motion control section configured to make the spindle axis perform a decelerated inverse rotation at maximum capacity and stop at the return completion position, by a position control, after the spindle axis reaches the intermediate return-rotation speed, based on the maximum acceleration of inverse rotation, the residual return-rotation amount and the current speed of inverse rotation. The decelerating-motion control section is configured to successively update a velocity command for the decelerated inverse rotation by the velocity control with use of the residual return-rotation amount and the current speed of inverse rotation, and to make the spindle axis perform the decelerated inverse rotation by the successively updated velocity command so that the residual return-rotation amount at an instant when the spindle axis reaches the intermediate return-rotation speed becomes equal to a positioning return-rotation amount of the spindle axis required for the spindle axis to stop at the return completion position under the position control.

A further aspect of the invention provides a method of controlling a machine tool, configured to control a synchronized operation of a spindle axis and a feed axis, the method comprising the steps, executed by a controller, of obtaining, from a tapping program, a total rotation amount and a maximum rotation speed of the spindle axis during a period when the spindle axis operates from a process start position to a target thread depth; making the spindle axis perform an accelerated rotation at maximum capacity from the process start position, by a velocity control in which the maximum rotation speed is set as a target value; detecting a maximum acceleration of the spindle axis during the accelerated rotation at maximum capacity, based on a rotational position feedback of the spindle axis; detecting a residual rotation amount of the spindle axis during a period when the spindle axis operates from a current position to the target thread depth, based on the total rotation amount and the rotational position feedback; detecting a current speed of the spindle axis based on the rotational position feedback; making the spindle axis perform a decelerated rotation so as to reach a predetermined intermediate rotation speed, by a velocity control, after the accelerated rotation at maximum capacity; and making the spindle axis perform a decelerated rotation at maximum capacity so as to reach the target thread depth, by a position control, after the spindle axis reaches the intermediate rotation speed, based on the maximum acceleration, the residual rotation amount and the current speed. The step of making the spindle axis reach the intermediate rotation speed includes the step of successively updating a velocity command for the decelerated rotation by the velocity control with use of the residual rotation amount and the current speed, and making the spindle axis perform the decelerated rotation by the successively updated velocity command so that the residual rotation amount at an instant when the spindle axis reaches the intermediate rotation speed becomes equal to a positioning rotation amount of the spindle axis required for the spindle axis to reach the target thread depth under the position control.

An yet further aspect of the invention provides a method of controlling a machine tool, configured to control a synchronized operation of a spindle axis and a feed axis, the method comprising the steps, executed by a controller, of obtaining, from a tapping program, a total return-rotation amount and a maximum return-rotation speed of the spindle axis during a period when the spindle axis operates from a target thread depth to a return completion position; making the spindle axis perform an accelerated inverse rotation at maximum capacity from the target thread depth or from an initial return position at which the spindle axis has returned by a predetermined rotation number from the target thread depth, by a velocity control in which the maximum return-rotation speed is set as a target value; detecting or obtaining a maximum acceleration of inverse rotation of the spindle axis during a period when the spindle axis performs the accelerated inverse rotation from the target thread depth; detecting a residual return-rotation amount of the spindle axis during a period when the spindle axis operates from a current position to the return completion position, based on the total return-rotation amount and a rotational position feedback of the spindle axis; detecting a current speed of inverse rotation of the spindle axis based on the rotational position feedback; making the spindle axis perform a decelerated inverse rotation so as to reach a predetermined intermediate return-rotation speed, by a velocity control, after the accelerated inverse rotation at maximum capacity; and making the spindle axis perform a decelerated inverse rotation at maximum capacity and stop at the return completion position, by a position control, after the spindle axis reaches the intermediate return-rotation speed, based on the maximum acceleration of inverse rotation, the residual return-rotation amount and the current speed of inverse rotation. The step of making the spindle axis reach the intermediate rotation speed includes the step of successively updating a velocity command for the decelerated inverse rotation by the velocity control with use of the residual return-rotation amount and the current speed of inverse rotation, and making the spindle axis perform the decelerated inverse rotation by the successively updated velocity command so that the residual return-rotation amount at an instant when the spindle axis reaches the intermediate return-rotation speed becomes equal to a positioning return-rotation amount of the spindle axis required for the spindle axis to stop at the return completion position under the position control.

The controller according to one aspect has a configuration wherein, when the spindle axis is made to perform a cutting motion from the process start position to the target thread depth, the numerical control section instructs only the total rotation amount and the maximum rotation speed, of the spindle axis, as the spindle axis command to the spindle-axis control section, and the spindle-axis control section performs, in accordance with the spindle axis command, the cutting motion by accelerating the spindle axis with a maximum power using a maximum permissible current, aiming at the maximum rotation speed, and continuously performs, based on the maximum acceleration during the accelerating step and the residual rotation amount and current speed of the spindle axis, the cutting motion until the target thread depth in the shortest time while decelerating the spindle axis at the maximum deceleration so as to make the spindle axis reach the target thread depth. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller has a configuration wherein, after the spindle axis performs the accelerated rotation at maximum capacity, the velocity control is executed in such a manner that, in accordance with the residual rotation amount and current speed of the spindle axis, the velocity command for the decelerated rotation is successively updated and thereby the spindle axis is made to perform the decelerated rotation so that the residual rotation amount when reaching the intermediate rotation speed becomes equal to the positioning rotation amount. Accordingly, it is possible to smoothly switch the velocity control to the position control for decelerating the spindle axis at maximum capacity without waiting time, and thereby to further reduce the cycle time of a tapping process and to reduce a mechanical or structural shock that may be caused on the spindle axis due to acute change in the acceleration when the velocity control is switched to the position control.

The controller according to the other aspect has a configuration wherein, when the spindle axis is made to perform a return motion from the target thread depth to the return completion position, the numerical control section instructs only the total return-rotation amount and the maximum return-rotation speed, of the spindle axis, as the spindle axis command to the spindle-axis control section, and the spindle-axis control section performs, in accordance with the spindle axis command, the return motion by accelerating the spindle axis with a maximum power using a maximum permissible current, aiming at the maximum return-rotation speed, and continuously performs, based on the maximum acceleration during the accelerating step and the residual return-rotation amount and current speed of the spindle axis, the return motion until the return completion position in the shortest time while decelerating the spindle axis at the maximum deceleration so as to make the spindle axis stop at the return completion position. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller has a configuration wherein, after the spindle axis performs the accelerated inverse rotation at maximum capacity, the velocity control is executed in such a manner that, in accordance with the residual return-rotation amount and current speed of the spindle axis, the velocity command for the decelerated inverse rotation is successively updated and thereby the spindle axis is made to perform the decelerated inverse rotation so that the residual return-rotation amount when reaching the intermediate return-rotation speed becomes equal to the positioning return-rotation amount. Accordingly, it is possible to smoothly switch the velocity control to the position control for decelerating the spindle axis at maximum capacity without waiting time, and thereby to further reduce the cycle time of a tapping process and to reduce a mechanical or structural shock that may be caused on the spindle axis due to acute change in the acceleration when the velocity control is switched to the position control. In the control method according to the further aspect, effects corresponding to those achieved by the above-described controller can be obtained.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
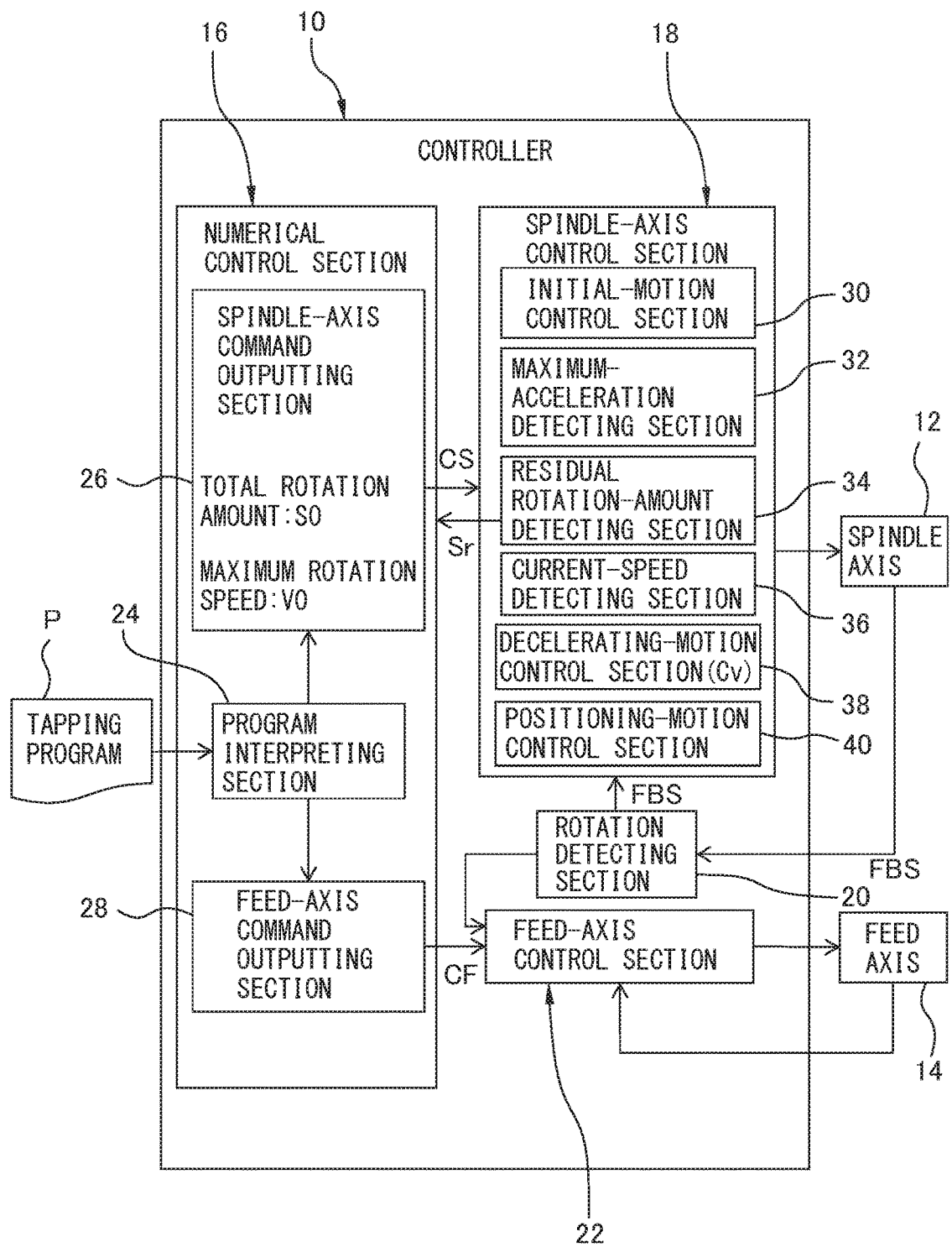
FIG. 1 is a functional block diagram showing a configuration of one embodiment of a machine tool controller.

Embodiments of the present invention will be described below with reference to the accompanying drawings. Throughout the drawings, corresponding components are denoted by common reference numerals.

FIG. 1 is a functional block diagram showing a configuration of a device of controlling (i.e., a controller 10 of) a machine tool, according to one embodiment. The controller 10 has a configuration for controlling a synchronized operation (so called a master-slave synchronization) of a spindle axis 12 and a feed axis 14, in a machine tool (e.g., a lathe, a drilling machine, a machining center, etc.) capable of performing a tapping process by the synchronized operation, in which the feed axis 14 operates to follow the rotational motion of the spindle axis 12 by taking into account a thread pitch designated by a tapping program P. Though not illustrated, the spindle axis 12 is a control axis provided for a drive unit, such as a spindle motor, that rotates a hold unit for holding a workpiece or a tool at a necessary speed for processing. Though not illustrated, the feed axis 14 is a control axis provided for a drive unit, such as a servo motor, that feeds a support unit for supporting a workpiece or a tool at a necessary speed for processing. For example, in a lathe, the tool may be linearly fed by the feed axis 14 relative to the workpiece rotated by the spindle axis 12, or alternatively, the workpiece rotated by the spindle axis 12 may be linearly fed by the feed axis 14 relative to the tool. On the other hand, in a drilling machine, the tool rotated by the spindle axis 12 may be linearly fed by the feed axis 14 relative to the workpiece, or alternatively, the workpiece may be linearly fed by the feed axis 14 relative to the tool rotated by the spindle axis 12. In any of the cases, the feed axis 14 that has a relatively wide margin of acceleration/deceleration torque during operation operates to follow the spindle axis 12 that has a relatively less margin of acceleration/deceleration torque during operation, whereby it is possible to reduce a synchronization error and improve a processing accuracy. It should be noted that in the present invention the configuration of the machine tool is not particularly limited.

The controller 10 includes a numerical control section 16 configured to prepare a spindle-axis command CS and a feed-axis command CF, based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The numerical control section 16 includes a program interpreting section 24 configured to interpret the tapping program P; a spindle-axis command outputting section 26 configured to prepare the spindle-axis command CS in accordance with the interpretation of the program interpreting section 24 and send the spindle-axis command CS to the spindle-axis control section 18; and a feed-axis command outputting section 28 configured to prepare the feed-axis command CF in accordance with the interpretation of the program interpreting section 24 and send the feed-axis command CF to the feed-axis control section 22. The numerical control section 16 may include a hardware configuration of a conventional CNC unit.

Before starting a tapping process, the spindle-axis command outputting section 26 obtains, from a command value provided in the tapping program P interpreted by the program interpreting section 24, a total rotation amount S0 and a maximum rotation speed V0, of the spindle axis 12, during a period when the spindle axis operates from a process start position (a rotational position) to a target thread depth (a rotational position), and sends the total rotation amount S0 and the maximum rotation speed V0 as the spindle-axis command CS to the spindle-axis control section 18. For example, in the case where the tapping program P includes instructions for processing an internal thread having a thread pitch of 1.25 mm and a thread depth of 30 mm with the maximum rotation speed (maximum revolutions per minute, in this example) V0 of the spindle axis 12 set at 3000 rev/min, the total rotation amount S0 of the spindle axis 12, from the process start position to the target thread depth, is calculated as 30÷1.25=24 (rev). Accordingly, the spindle-axis command outputting section 26 notifies the spindle-axis control section 18 of V0=3000 (rev/min) and S0=24 (rev). In this way, the spindle-axis command CS does not include a position command and/or an acceleration/deceleration command, which makes the spindle axis 12 perform a rotational motion until the target thread depth.

The spindle-axis control section 18 controls the rotational motion of the spindle axis 12 by a conventional feedback control, with use of a rotational position FBS (i.e., a feedback value) of the spindle axis 12 detected by the rotation detecting section 20. The feed-axis control section 22 controls the feed motion of the feed axis 14, which follows the motion of the spindle axis 12, by a feedback control, with use of the rotational position FBS of the spindle axis 12 in addition to the feedback value of the feed position of the feed axis 14. The rotation detecting section 20 can obtain the rotational position FBS from the output of a position detector (not shown), such as an encoder, etc., for detecting the operating position of the drive unit of the spindle axis 12.

The spindle-axis control section 18 includes an initial-motion control section 30 configured to make the spindle axis 12 perform an accelerated rotation at maximum capacity from the process start position, by a velocity control in which the maximum rotation speed V0, sent from the spindle-axis command outputting section 26, is set as a target value; a maximum-acceleration detecting section 32 configured to detect a maximum acceleration A0 (unit may be represented as, e.g., rev/min$^2$) of the spindle axis 12 during the accelerated rotation at maximum capacity, based on the rotational position FBS; a residual rotation-amount detecting section 34 configured to detect a residual rotation amount Sr of the spindle axis 12 during a period when the spindle axis operates from a current position (a rotational position) to the target thread depth, based on the total rotation amount S0, sent from the spindle-axis command outputting section 26, and the rotational position FBS; a current-speed detecting section 36 configured to detect a current speed Vc of the spindle axis 12 based on the rotational position FBS; a decelerating-motion control section 38 configured to make the spindle axis 12 perform a decelerated rotation so as to reach a predetermined intermediate rotation speed Vi, by a velocity control, after the accelerated rotation at maximum capacity; and a positioning-motion control section 40 configured to make the spindle axis 12 perform a decelerated rotation at maximum capacity so as to reach the target thread depth, by a position control, after the spindle axis reaches the intermediate rotation speed, based on the maximum acceleration A0, the residual rotation amount Sr and the current speed Vc. The positioning-motion control section 40 may be configured to make the spindle axis 12 stop at the target thread depth. Alternatively, the positioning-motion control section 40 may be configured not to make the spindle axis 12 stop at the target thread depth.

The controller 10 is capable of controlling, in a tapping process using a machine tool, a motion of the spindle axis 12 for cutting a pilot hole of a workpiece with a tool until a target thread depth (referred to as a cutting motion, in this application). Also, the controller 10 is capable of controlling, in a tapping process using a machine tool, a motion of the spindle axis 12 for pulling out a tool from a workpiece after cutting a pilot hole of the workpiece until a target thread depth (referred to as a return motion, in this application).

Figure 2:
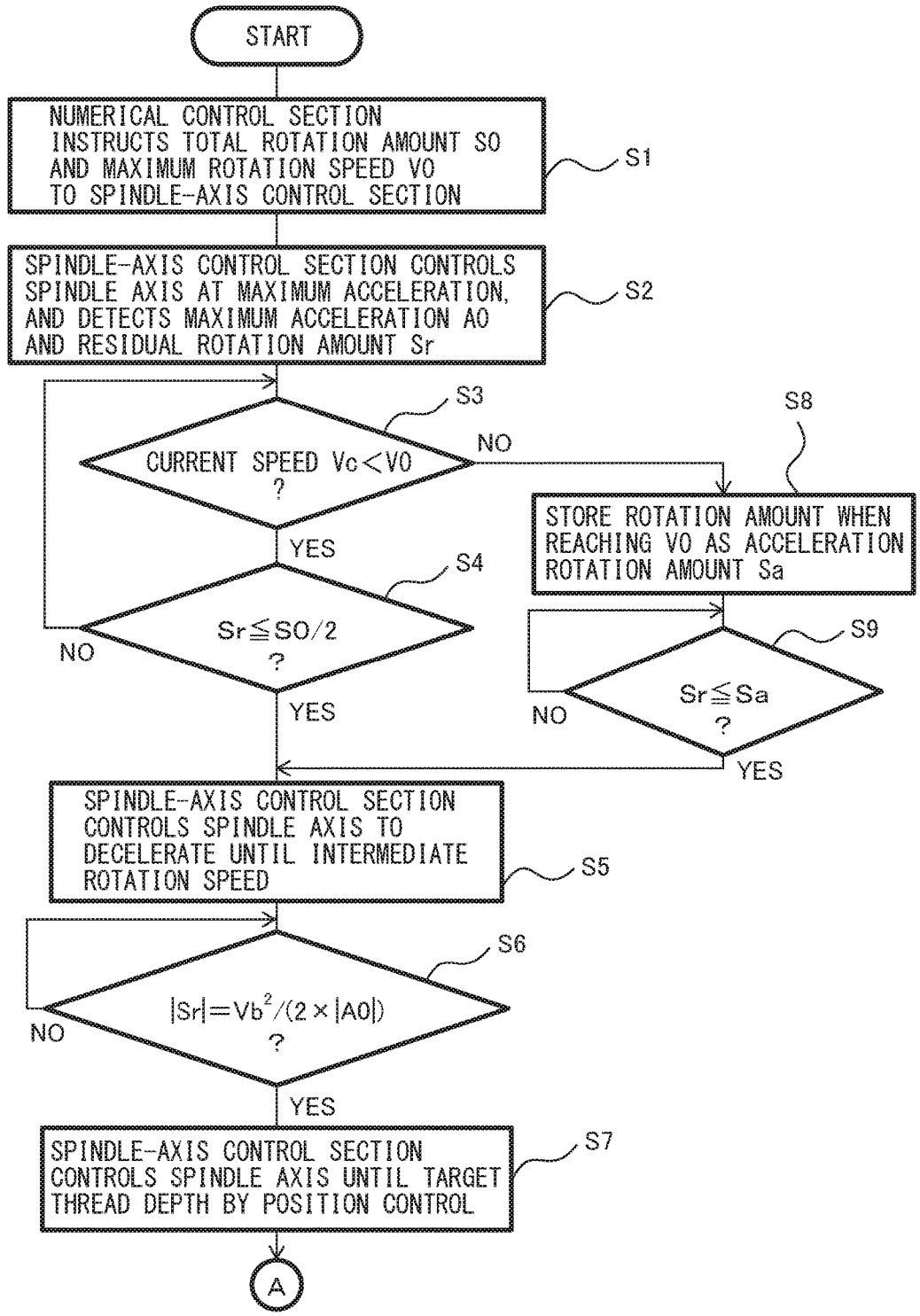
FIG. 2 is a flowchart for showing a cutting motion control method for a tapping process, which is one embodiment of a machine tool control method.

FIG. 2 shows a cutting motion control method adapted to be performed for the spindle axis 12 in a tapping process, as one embodiment of a method of controlling a machine tool executed by the controller 10. The configuration of the controller 10 will be described below in detail, with reference to one example of a cutting motion control flowchart illustrated in FIG. 2 as well as FIG. 1. First, at step S1, the numerical control section 16 (the spindle-axis command outputting section 26) instructs the total rotation amount S0 and maximum rotation speed V0 of the spindle axis 12 to the spindle-axis control section 18. At step S2, the spindle-axis control section 18 (the initial-motion control section 30, the maximum-acceleration detecting section 32 and the residual rotation-amount detecting section 34) makes the spindle axis 12 perform the accelerated rotation at maximum capacity using the maximum permissible current of the drive source to perform the cutting motion from the process start position, with the maximum rotation speed V0 set as a target speed, detects the maximum acceleration A0 during the accelerated rotation at maximum capacity, and sequentially detects the residual rotation amount Sr from the current position. The spindle-axis control section 18 notifies the detected residual rotation amount Sr to the numerical control section 16 every time it is detected.

Next, at step S3, the spindle-axis control section 18 (the current-speed detecting section 36) sequentially detects the current speed Vc during the accelerated rotation at maximum capacity, and judges whether the current speed Vc has not reached the maximum rotation speed V0 every time it is detected. If Vc has not yet reached V0, the spindle-axis control section 18 judges, at step S4, whether the residual rotation amount Sr is equal to or less than one-half of the total rotation amount S0. If Sr is equal to or less than one-half of S0, the spindle-axis control section 18 (the decelerating-motion control section 38) makes, at step S5, the spindle axis 12 perform the decelerated rotation until the intermediate rotation speed Vi, so as to continuously perform the cutting motion. If Sr is not equal to or not less than one-half of S0, the control flow returns to step S3.

Figure 3:
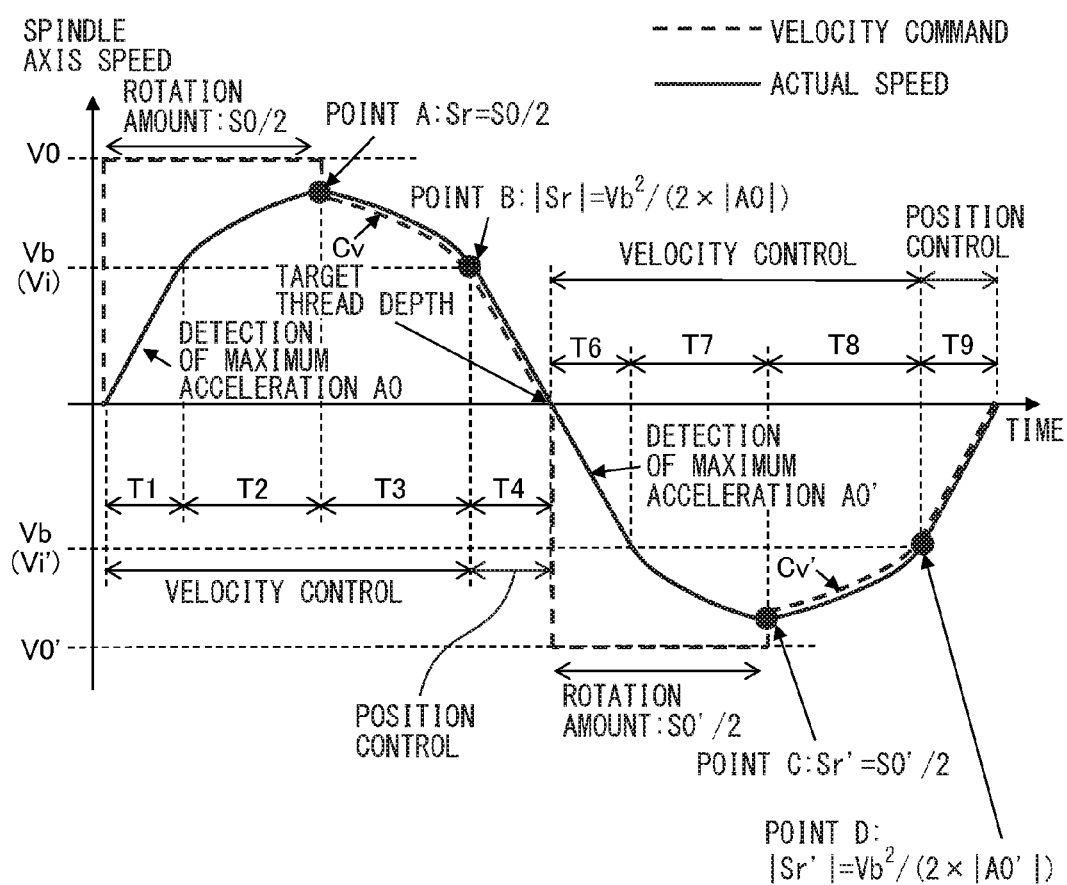
FIG. 3 is a diagram showing one example of the motion of a spindle axis in the embodiment of FIG. 2.

Referring now to FIG. 3, one example of the cutting motion of the spindle axis 12, in the case where the residual rotation amount Sr reaches one-half of the total rotation amount S0 before the current speed Vc reaches the maximum rotation speed V0 (i.e., in the case where the judgment results at respective steps S3 and S4 are YES), is depicted by a speed-time curve (the curve above a time axis). In FIG. 3, a rotational speed Vb (e.g., the base speed of the spindle motor) is previously determined for the spindle axis 12, such that an acceleration with a constant torque (i.e., a constant acceleration) can be performed from the start of operation to the speed Vb, and may be stored as one of control parameters in a memory (not shown) of the controller 10. In practice, the speed Vb may take any value equal to or less than the base speed of the spindle motor (or a speed determined by taking into account a reduction ratio, if any, between the spindle motor and the spindle axis 12).

The accelerated rotation at maximum capacity of the spindle axis 12 at step S2 is performed during time periods T1 and T2 shown in FIG. 3, and the maximum acceleration A0 is detected during the constant acceleration in the time period T1 (i.e., a time period from a point when the spindle axis starts at the process start position to a point when the spindle axis reaches the speed Vb). When the rotational speed of the spindle axis 12 exceeds Vb, the acceleration of the spindle axis 12 gradually decreases from the maximum acceleration A0 due to the characteristics of the spindle motor. At a time point A when the residual rotation amount Sr reaches one-half of the total rotation amount S0 (i.e., when the rotation amount from the start of processing reaches one-half of the total rotation amount S0) (or when the judgment result at step S4 becomes YES), the motion of the spindle axis 12 changes from the accelerated rotation to the decelerated rotation, and in time period T3, the spindle axis 12 performs the decelerated rotation at step S5.

During the time period T3 (step S5), the spindle-axis control section 18 (the residual rotation-amount detecting section 34 and the current-speed detecting section 36) also sequentially detects the residual rotation amount Sr from the current position and the current speed Vc, of the spindle axis 12. In the time period T3 (step S5), the spindle-axis control section 18 (the decelerating-motion control section 38) executes the velocity control to make the spindle axis 12 perform the decelerated rotation from the point A until the intermediate rotation speed Vi, and in the meantime, successively updates a velocity command Cv for the decelerated rotation with use of the residual rotation amount Sr and the current speed Vc (velocity command Cv is illustrated by a broken line in FIG. 3). More specifically, the decelerating-motion control section 38 successively updates the velocity command Cv, and makes the spindle axis 12 perform the decelerated rotation by the successively updated velocity command Cv so that the residual rotation amount Sr of the spindle axis 12 at an instant when the spindle axis 12 reaches the predetermined intermediate rotation speed Vi becomes equal to a positioning rotation amount Spos of the spindle axis 12 required for the spindle axis to reach the target thread depth under the position control executed by the positioning-motion control section 40.

The positioning rotation amount Spos corresponds to a position of a time point B (FIG. 3), at which it is expected that the residual rotation amount Sr becomes equal to zero and the current speed Vc becomes equal to zero (i.e., the spindle axis reaches the target thread depth) when the spindle axis is decelerated from the current speed Vc (hereinafter described as a rotation number per second (unit thereof being represented as rev/s)) at the maximum deceleration A0 (negative value) corresponding to the maximum acceleration A0 ($rev/s^2$) detected at step S2. The positioning rotation amount Spos is determined, as the absolute value of the residual rotation amount Sr (negative value) as seen from the point of Sr=0, by the following equation:

$$|Sr|=Vc^2/(2\times|A0|)=Spos$$

based on a formula:

$$Vc^2=2\times|A0|\times|Sr|$$

In this embodiment, it is premised that the spindle axis 12 is decelerated at the constant maximum deceleration A0 from the point B, in order to facilitate a calculation for the position control from the point B until the target thread depth. Accordingly, it is assumed that the current speed Vc of the spindle axis 12 has reached Vb at the point B. As a result, the positioning rotation amount Spos can be determined as:

$$Spos=Vb^2/(2\times|A0|)$$

Based on the above premise, the intermediate rotation speed Vi is considered to be equal to the current speed Vb of the spindle axis at the point B.

Under the above premise, if the residual rotation amount Sr at an instant when the spindle axis 12 reaches the intermediate rotation speed Vi (=Vb) is equal to the positioning rotation amount Spos of the spindle axis 12, the correspondence between the residual rotation amount (i.e., the current position) Sr, the current speed Vc (rev/s) and the current deceleration Ac ($rev/s^2$), of the spindle axis 12 during the time period T3, is represented by the following equation:

$$|Ac|=(Vc^2-Vb^2)/(2\times(Sr-Spos))$$

based on a formula:

$$Vc^2-Vb^2=2\times|Ac|\times(Sr-Spos)$$

In the time period T3 (step S5), the spindle-axis control section 18 (the decelerating-motion control section 38) constantly monitors the residual rotation amount Sr and the current speed Vc of the spindle axis 12, and determines a new or updated velocity command Cv by subtracting a value obtained by multiplying the aforementioned current deceleration Ac by a velocity-command updating cycle Tctl (sec) (i.e., a cycle of preparing the velocity command and notifying it to the spindle axis 12 by the decelerating-motion control section 38) from the current speed Vc (i.e., the last velocity command Cv). The velocity command Cv is represented by the following equation:

$$Cv=Vc-Ac \times Tctl$$

According to the above equation, the decelerating-motion control section 38 successively updates the velocity command Cv in the velocity-command updating cycle Tctl. The spindle axis 12 performs the decelerated rotation while gradually increasing the deceleration Ac in accordance with the successively updated velocity command Cv, during the operation from the point A to the point B, and reaches the point B at an instant when being decelerated to the intermediate rotation speed Vi (=Vb) (FIG. 3).

Turning back to FIG. 2, at step S6, the spindle-axis control section 18 (the positioning-motion control section 40) judges whether the absolute value |Sr| of the residual rotation amount Sr of the spindle axis 12 satisfies the equation: $|Sr|=Vb^2/(2\times|A0|)$ (hereinafter referred to as equation 1) (i.e., whether or not the rotational position of the spindle axis 12 has reached the point B). If the equation 1 is satisfied, the spindle-axis control section 18 (the positioning-motion control section 40) prepares, at step S7, a command for making the spindle axis 12 perform the decelerated rotation at the maximum deceleration A0 and reach the point of Sr=0 (i.e., the target thread depth) (in the motion example of FIG. 3, a command for stopping the spindle axis 12 at the target thread depth), and executes a position control for the spindle axis 12 with use of the prepared command. If the equation 1 is not satisfied, the judgment at step S6 is repeated until the equation 1 is satisfied. The spindle axis 12 performs, in accordance with the command from the spindle-axis control section 18 (the positioning-motion control section 40), the cutting motion from the point B toward the target thread depth, by performing the decelerated rotation at the maximum deceleration A0, and reaches the target thread depth when Sr becomes equal to zero (in the motion example of FIG. 3, the spindle axis is stopped at the target thread depth). In this way, in the time period T4 (FIG. 3) in which the spindle axis operates from the point B to reach the target thread depth, the spindle-axis control section 18 executes a position control for the spindle axis 12 (a velocity command at a constant acceleration, obtained from a position command, is shown by a broken line).

If it is judged, at step S3, that the current speed Vc has reached the maximum rotation speed V0, the spindle-axis control section 18 stores, at step S8, a rotation amount (i.e., a rotational position FBS) of the spindle axis 12 from the process start position at an instant when the spindle axis reaches the maximum rotation speed V0, as an acceleration rotation amount Sa. Then, at step S9, the spindle-axis control section 18 judges whether the residual rotation amount Sr is equal to or less than the acceleration rotation amount Sa. If Sr is equal to or less than Sa, the control flow goes to step S5, and subsequently executes steps S6 and S7, so as to perform the cutting motion until the target thread depth. If Sr is not equal to or not less than Sa, the judgment at step S9 is repeated until Sr becomes equal to or less than Sa.

Figure 4:
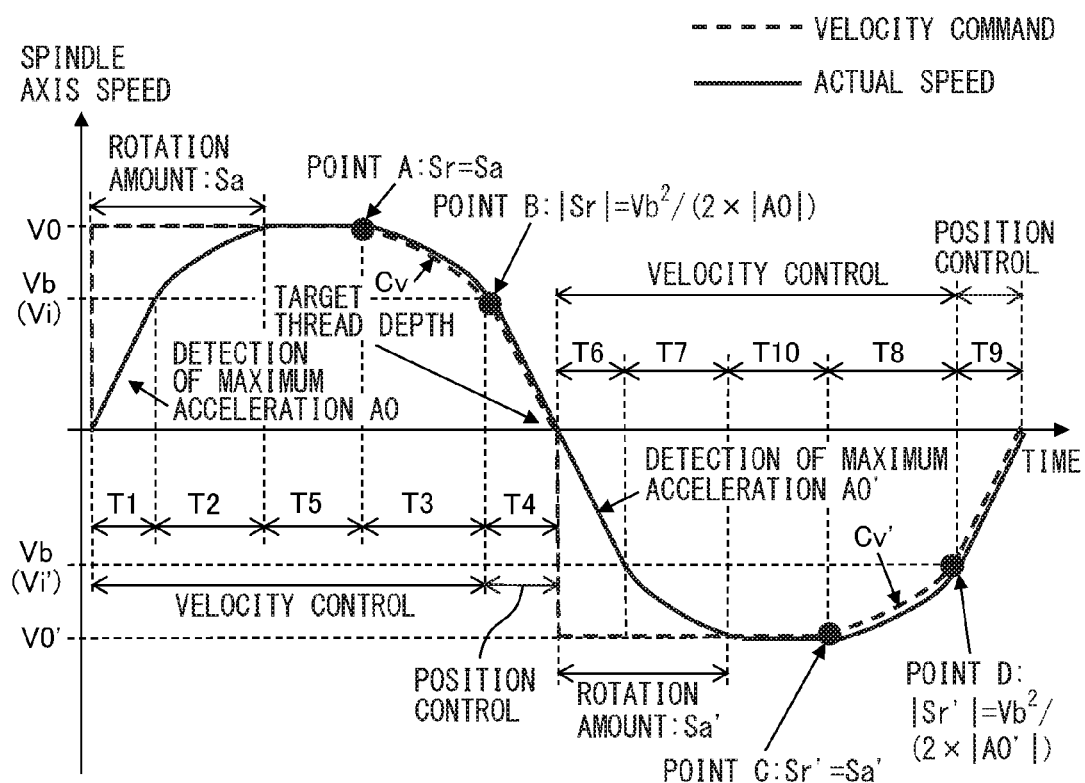
FIG. 4 is a diagram showing another example of the motion of the spindle axis in the embodiment of FIG. 2.

Referring now to FIG. 4, one example of the cutting motion of the spindle axis 12, in the case where the current speed Vc reaches the maximum rotation speed V0 before the residual rotation amount Sr reaches one-half of the total rotation amount S0 (i.e., in the case where the judgment result at step S3 is No), is depicted by a speed-time curve (the curve above a time axis). As shown in FIG. 4, the accelerated rotation of the spindle axis 12 at maximum capacity at step S2 is performed during time periods T1 and T2, and the maximum acceleration A0 is detected during the constant acceleration in the time period T1 (i.e., a time period from a point when the spindle axis starts at the process start position to a point when the spindle axis reaches the speed Vb). When the rotational speed of the spindle axis 12 exceeds Vb, the acceleration of the spindle axis 12 gradually decreases from the maximum acceleration A0 due to the characteristics of the spindle motor. The current speed Vc of the spindle axis 12 reaches the maximum rotation speed V0 before the residual rotation amount Sr reaches one-half of the total rotation amount S0. Thereafter, the spindle axis 12 rotates at the constant speed V0 (i.e., null acceleration) over time period T5 so as to continue the cutting motion. At a time point A when the residual rotation amount Sr becomes equal to the acceleration rotation amount Sa (i.e., when the judgment result at S9 becomes YES), the motion of the spindle axis 12 changes from the accelerated rotation to the decelerated rotation. Then, in time period T3 (step S5), the spindle axis 12 performs the decelerated rotation (by the velocity control) while gradually increasing the aforementioned deceleration Ac, and in time period T4 (step S7), the spindle axis 12 performs the decelerated rotation (by the position control) at the maximum deceleration A0. In the time periods T1, T2, T3 and T4, the spindle axis 12 operates in the same manner as the motion shown in FIG. 3.

In the motion examples shown in FIGS. 3 and 4, during a period when the spindle-axis control section 18 controls the rotational motion of the spindle axis 12 from the process start position to the target thread depth, the feed-axis control section 22 (FIG. 1) controls the feed axis 14 so as to perform a feed motion while following the motion of the spindle axis 12, with use of the rotational position FBS of the spindle axis 12. During a period when the spindle-axis control section 18 executes the processes from step S1 to step S9, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero).

Figure 5:
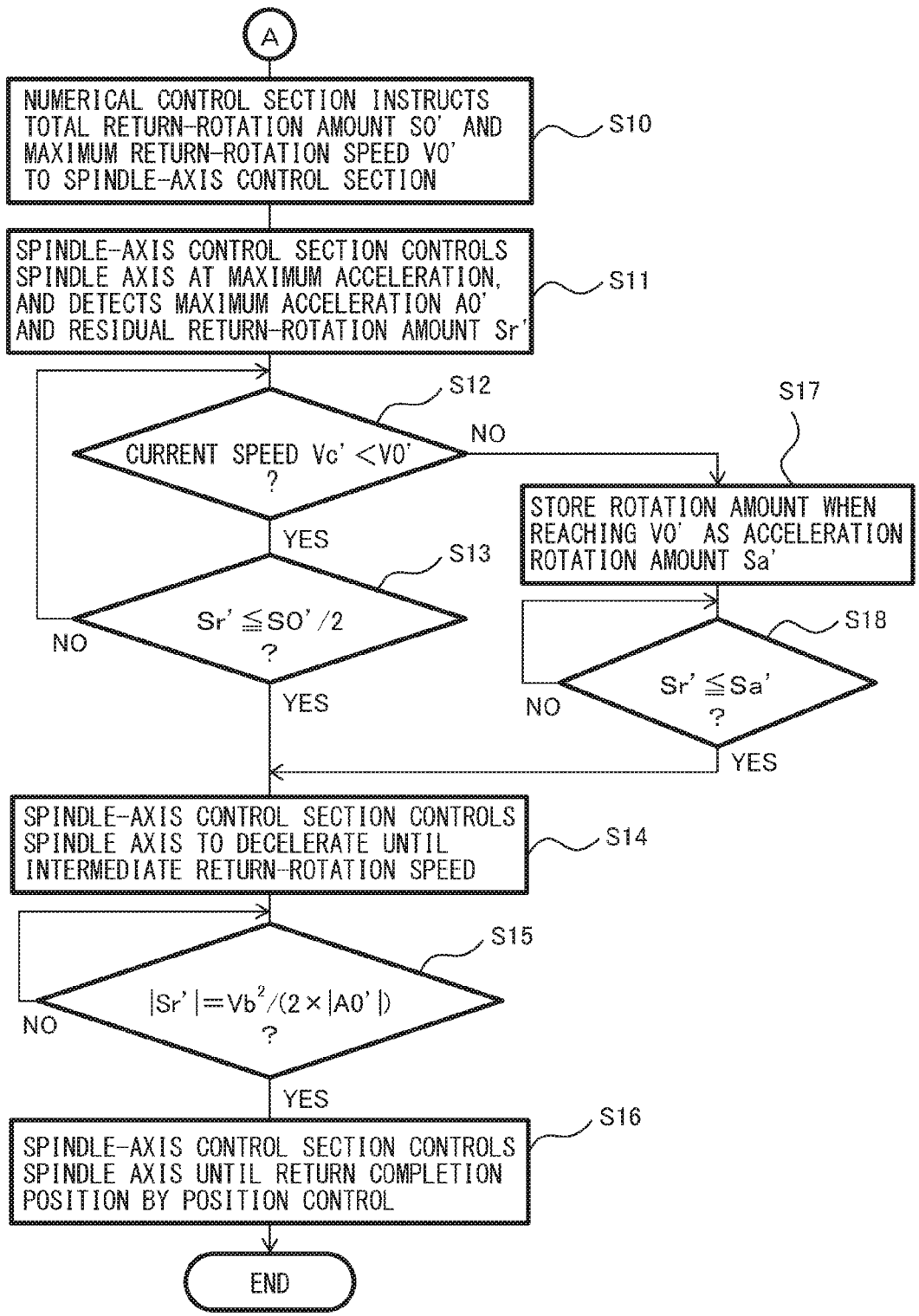
FIG. 5 is a flowchart for showing a return motion control method for a tapping process, which is one embodiment of a machine tool control method.

In a tapping process using a machine tool, it is necessary to perform a return motion of the spindle axis 12 for pulling out a tool from a workpiece after cutting a pilot hole to the workpiece until a target thread depth. In the case where the aforementioned embodiment has a configuration wherein the positioning-motion control section 40 makes the spindle axis 12 stop at the target thread depth, the controller 10 is capable of controlling the return motion in a manner similar to the aforementioned control of the cutting motion from the process start position to the target thread depth. FIG. 5 shows a return motion control method adapted to be performed for the spindle axis 12 in a tapping process, as one embodiment of a method of controlling a machine tool executed by the controller 10. FIGS. 3 and 4 show one example of the return motion of the spindle axis 12, corresponding to the aforementioned cutting motion of the spindle axis 12, by a speed-time curve (the curve below a time axis), in addition to the cutting motion. With reference to FIGS. 3 to 5 in addition to FIG. 1, one example of a control flow of the return motion executed by the controller 10 will be described below.

After it is judged that the tapping process has reached the target thread depth in the process flow shown in FIG. 2, the numerical control section 16 (the spindle-axis command outputting section 26) obtains, at step S10, a total return-rotation amount S0' and a maximum return-rotation speed V0', of the spindle axis 12, during a period when the spindle axis operates from the target thread depth to the return completion position, from a command value provided in the tapping program P interpreted by the program interpreting section 24, and sends the total return-rotation amount S0' and the maximum return-rotation speed V0' as a spindle-axis command CS to the spindle-axis control section 18. The spindle-axis command CS for the return motion also does not include a position command and/or an acceleration/deceleration command, which makes the spindle axis 12 perform a rotational motion until the return completion position. Note that the return completion position may be the same as the process start position, or may be different from the process start position. In the case where the return completion position coincides with the process start position, the total return-rotation amount S0' is equal to the total rotation amount S0 in the cutting motion, but the maximum return-rotation speed V0' is not always equal to the maximum rotation speed V0 in the cutting motion. Also, if the total return-rotation amount S0' and the maximum return-rotation speed V0' are equal to the total rotation amount S0 and the maximum rotation speed V0 in the cutting motion, the return motion is depicted by the substantially same speed-time curve as that of the cutting motion, but if the total return-rotation amount S0' and the maximum return-rotation speed V0' are different from the total rotation amount S0 and the maximum rotation speed V0 in the cutting motion, the return motion is not always depicted by the same speed-time curve as that of the cutting motion.

At step S11, the spindle-axis control section 18 (the initial-motion control section 30, the maximum-acceleration detecting section 32 and the residual rotation-amount detecting section 34) executes the following processes. The initial-motion control section 30 makes the spindle axis 12 perform an accelerated inverse rotation at maximum capacity using the maximum permissible current of the drive source from the target thread depth, by a velocity control in which the maximum return-rotation speed V0' is set as a target value, so as to perform the return motion. The maximum-acceleration detecting section 32 detects a maximum acceleration A0' of inverse rotation of the spindle axis 12, during the accelerated inverse rotation at maximum capacity from the target thread depth, based on the rotational position FBS. The residual rotation-amount detecting section 34 sequentially detects a residual return-rotation amount Sr' of the spindle axis 12 during a period when the spindle axis operates from a current position to the return completion position, based on the total return-rotation amount S0' and the rotational position FBS. The spindle-axis control section 18 notifies the detected residual return-rotation amount Sr' to the numerical control section 16 every time it is detected.

Next, at step S12, the spindle-axis control section 18 (the current-speed detecting section 36) sequentially detects a current speed Vc' of inverse rotation of the spindle axis 12, based on the rotational position FBS during the accelerated inverse rotation at maximum capacity, and judges whether the current speed Vc' has not reached the maximum return-rotation speed V0' every time it is detected. If Vc' has not reached V0', the spindle-axis control section 18 judges, at step S13, whether the residual return-rotation amount Sr' is equal to or less than one-half of the total return-rotation amount S0'. If Sr' is equal to or less than one-half of S0', the spindle-axis control section 18 (the decelerating-motion control section 38) makes, at step S14, the spindle axis 12 perform a decelerated inverse rotation and continuously perform the return motion, so as to reach an intermediate return-rotation speed Vi', by a velocity control, after the accelerated inverse rotation at maximum capacity. If Sr' is not equal to or not less than one-half of S0', the control flow returns to step S12.

Referring now to FIG. 3, one example of the return motion of the spindle axis 12, in the case where the residual return-rotation amount Sr' reaches one-half of the total return-rotation amount S0' before the current speed Vc' of inverse rotation reaches the maximum return-rotation speed V0' (i.e., in the case where the judgment results at respective steps S3 and S4 are YES), is depicted by a speed-time curve (the curve below a time axis). The accelerated inverse rotation at maximum capacity of the spindle axis 12 at step S11 is performed during time periods T6 and T7 shown in FIG. 3, and the maximum acceleration A0' of inverse rotation is detected during the constant acceleration in the time period T6 (i.e., a time period from a point when the spindle axis starts at the target thread depth to a point when the spindle axis reaches the aforementioned speed Vb (of the inverse rotation)). When the rotational speed of the spindle axis 12 exceeds Vb, the acceleration of the spindle axis 12 gradually decreases from the maximum acceleration A0' due to the characteristics of the spindle motor. At a time point C when the residual return-rotation amount Sr' reaches one-half of the total return-rotation amount S0' (i.e., when the rotation amount from the start of returning reaches one-half of the total return-rotation amount S0') (or when the judgment result at step S13 becomes YES), the motion of the spindle axis 12 changes from the accelerated inverse rotation to the decelerated inverse rotation, and in time period T8, the spindle axis 12 performs the decelerated inverse rotation at step S14.

During the time period T8 (step S14), the spindle-axis control section 18 (the residual rotation-amount detecting section 34 and the current-speed detecting section 36) also sequentially detects the residual return-rotation amount Sr' from the current position and the current speed Vc' of inverse rotation, of the spindle axis 12. In the time period T8 (step S14), the spindle-axis control section 18 (the decelerating-motion control section 38) executes the velocity control to make the spindle axis 12 perform the decelerated inverse rotation from the point C until the intermediate return-rotation speed Vi', and in the meantime, successively updates a velocity command Cv' for the decelerated inverse rotation with use of the residual return-rotation amount Sr' and the current speed Vc' of inverse rotation (velocity command Cv' is illustrated by a broken line in FIG. 3). More specifically, the decelerating-motion control section 38 successively updates the velocity command Cv', and makes the spindle axis 12 perform the decelerated inverse rotation by the successively updated velocity command Cv' so that the residual return-rotation amount Sr' of the spindle axis 12 at an instant when the spindle axis 12 reaches the predetermined intermediate return-rotation speed Vi' becomes equal to a positioning return-rotation amount Spos' of the spindle axis 12 required for the spindle axis to stop at the return completion position under the position control executed by the positioning-motion control section 40.

The positioning return-rotation amount Spos' can be determined, analogously to the aforementioned positioning rotation amount Spos, by the following equation:

$$Spos'=Vb^2/(2\times|A0'|)$$

In this embodiment, it is premised that the spindle axis 12 is decelerated at the constant maximum deceleration A0' (negative value) (corresponding to the maximum acceleration A0' of inverse rotation) from the point D, in order to facilitate a calculation for the position control from the point D until the return completion position. Accordingly, it is assumed that the current speed Vc' of the spindle axis 12 has reached Vb at the point D (i.e., the intermediate return-rotation speed Vi'=Vb).

Under the above premise, if the residual return-rotation amount Sr' at an instant when the spindle axis 12 reaches the intermediate return-rotation speed Vi' (=Vb) is equal to the positioning return-rotation amount Spos' of the spindle axis 12, the correspondence between the residual return-rotation amount (i.e., the current position) Sr', the current speed Vc' (rev/s) and the current deceleration Ac' (rev/s²), of the spindle axis 12 during the time period T3, is represented by the following equation:

$$|Ac'|=(Vc'^2-Vb^2)/(2\times(Sr'-Spos'))$$

based on a formula:

$$Vc'^2-Vb^2=2\times|Ac'|\times(Sr'-Spos')$$

In the time period T8 (step S14), the spindle-axis control section 18 (the decelerating-motion control section 38) constantly monitors the residual return-rotation amount Sr' and the current speed Vc' of inverse rotation of the spindle axis 12, and determines a new or updated velocity command Cv' by subtracting a value obtained by multiplying the aforementioned current deceleration Ac' by a velocity-command updating cycle Tctl (sec) from the current speed Vc' (i.e., the last velocity command Cv'). The velocity command Cv' is represented by the following equation:

$$Cv'=Vc'-Ac'\times Tctl$$

According to the above equation, the decelerating-motion control section 38 successively updates the velocity command Cv' in the velocity-command updating cycle Tctl. The spindle axis 12 performs the decelerated inverse rotation while gradually increasing the deceleration Ac' in accordance with the successively updated velocity command Cv', during the operation from the point C to the point D, and reaches the point D at an instant when being decelerated to the intermediate return-rotation speed Vi' (=Vb) (FIG. 3).

Turning back to FIG. 5, at step S15, the spindle-axis control section 18 (the positioning-motion control section 40) judges whether the absolute value |Sr'| of the residual return-rotation amount Sr' of the spindle axis 12 satisfies the equation: $|Sr'|=Vb^2/(2\times|A0'|)$ (hereinafter referred to as equation 2) (i.e., whether or not the rotational position of the spindle axis 12 has reached the point D). If the equation 2 is satisfied, the spindle-axis control section 18 (the positioning-motion control section 40) prepares, at step S16, a command for making the spindle axis 12 perform the decelerated inverse rotation at the maximum deceleration A0' and reach the point of Sr'=0 (i.e., the return completion position), and executes a position control for the spindle axis 12 with use of the prepared command. If the equation 2 is not satisfied, the judgment at step S15 is repeated until the equation 2 is satisfied. The spindle axis 12 performs, in accordance with the command from the spindle-axis control section 18 (the positioning-motion control section 40), the return motion from the point D toward the return completion position, by performing the decelerated inverse rotation at maximum deceleration A0', and reaches and stops at the return completion position when Sr' becomes equal to zero. In this way, in the time period T9 (FIG. 3) in which the spindle axis operates from the point D to reach the return completion position, the spindle-axis control section 18 executes a position control for the spindle axis 12 (a velocity command at a constant acceleration, obtained from a position command, is shown by a broken line).

If it is judged, at step S12, that the current speed Vc' has reached the maximum return-rotation speed V0', the spindle-axis control section 18 stores, at step S17, a rotation amount of the spindle axis 12 from the target thread depth (i.e., a rotational position FBS) at an instant when the spindle axis reaches the maximum return-rotation speed V0', as an acceleration rotation amount Sa' of the return motion. Then, at step S18, the spindle-axis control section 18 judges whether the residual return-rotation amount Sr' is equal to or less than the acceleration rotation amount Sa'. If Sr' is equal to or less than Sa', the control flow goes to step S14, and subsequently executes steps S15 and S16, so as to perform the return motion until the return completion position. If Sr' is not equal to or not less than Sa', the judgment at step S18 is repeated until Sr' becomes equal to or less than Sa'.

Referring now to FIG. 4, one example of the return motion of the spindle axis 12, in the case where the current speed Vc' of inverse rotation reaches the maximum return-rotation speed V0' before the residual return-rotation amount Sr' reaches one-half of the total return-rotation amount S0' (i.e., in the case where the judgment result at step S12 is No), is depicted by a speed-time curve (the curve below a time axis). As shown in FIG. 4, the accelerated inverse rotation of the spindle axis 12 at maximum capacity at step S11 is performed during time periods T6 and T7, and the maximum acceleration A0' of inverse rotation is detected during a constant acceleration in time period T6 (i.e., a time period from a point when the spindle axis starts at the target thread depth to a point when the spindle axis reaches the aforementioned speed Vb (of the inverse rotation)). When the rotational speed of the spindle axis 12 exceeds Vb, the acceleration of the spindle axis 12 gradually decreases from the maximum acceleration A0' due to the characteristics of the spindle motor. The current speed Vc' of the spindle axis 12 reaches the maximum return-rotation speed V0' before the residual return-rotation amount Sr' reaches one-half of the total return-rotation amount S0', and thereafter, the spindle axis 12 inversely rotates at the constant speed V0' (i.e., null acceleration) over time period T10 so as to continue the return motion. At a time point C when the residual return-rotation amount Sr' becomes equal to the acceleration rotation amount Sa' (i.e., when the judgment result at S18 becomes YES), the motion of the spindle axis 12 changes from the accelerated inverse rotation to the decelerated inverse rotation. Then, in time period T8 (step S14), the spindle axis 12 performs the decelerated inverse rotation (by the velocity control) while gradually increasing the aforementioned deceleration Ac', and in time period T9 (step S16), the spindle axis 12 performs the decelerated inverse rotation (by the position control) at the maximum deceleration A0'. In the time periods T6, T7, T8 and T9, the spindle axis 12 operates in the same manner as the motion shown in FIG. 3.

In the motion examples shown in FIGS. 3 and 4, during a period when the spindle-axis control section 18 controls the inverse rotational motion of the spindle axis 12 from the target thread depth to the return completion position, the feed-axis control section 22 (FIG. 1) controls the feed axis 14 so as to perform an inverse feed motion while following the motion of the spindle axis 12, with use of the rotational position FBS of the spindle axis 12. During a period when the spindle-axis control section 18 executes the processes from step S10 to step S18, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

The controller 10 according to the embodiment depicted in FIGS. 1 to 5 has a configuration wherein, when the spindle axis 12 is made to perform the cutting motion from the process start position to the target thread depth, the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the maximum acceleration A0 during the accelerating step and the sequentially detected residual rotation amount Sr and current speed Vc of the spindle axis 12, the cutting motion until the target thread depth in the shortest time while decelerating the spindle axis 12 at the maximum deceleration A0 so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, after the spindle axis 12 performs the accelerated rotation at maximum capacity, the velocity control is executed in such a manner that, in accordance with the residual rotation amount Sr and current speed Vc of the spindle axis 12, the velocity command Cv for the decelerated rotation is successively updated and thereby the spindle axis 12 is made to perform the decelerated rotation at the gradually increasing deceleration Ac from the point A so that the residual rotation amount Sr when reaching the intermediate rotation speed Vi (=Vb) becomes equal to the positioning rotation amount Spos. Accordingly, it is possible to smoothly switch the velocity control to the position control for decelerating the spindle axis 12 at maximum deceleration A0 from the point B without waiting time. In this connection, the waiting time is known to be spent as a time period when, in a case where the spindle axis 12 is made to perform a decelerated rotation at maximum capacity from the point A with the speed Vb set as a fixed target value, the spindle axis 12 is made to slightly rotate at a constant speed after reaching the speed Vb so as to enable a subsequent position control to accurately start from the point B. Therefore, according to the controller 10, it is possible to further reduce the cycle time of a tapping process since the waiting time is not required to switch the velocity control to the position control during the decelerated rotation of the spindle axis 12, and to reduce a mechanical or structural shock that may be caused on the spindle axis 12 due to change in the acceleration since the acute change in the acceleration at an instant when the velocity control is switched to the position control can be eliminated.

In addition, the controller 10 according to the above embodiment has a configuration wherein, when the spindle axis 12 is made to perform the return motion from the target thread depth to the return completion position, the numerical control section 16 instructs only the total return-rotation amount S0' and the maximum return-rotation speed V0', of the spindle axis 12, as the spindle axis command CS to the spindle-axis control section 18, and the spindle-axis control section 18 performs, in accordance with the spindle axis command CS, the return motion by accelerating the spindle axis 12 with the maximum power using the maximum permissible current, aiming at the maximum return-rotation speed V0', and continuously performs, based on the maximum acceleration A0' during the accelerating step and the sequentially detected residual return-rotation amount Sr' and current speed Vc' of the spindle axis 12, the return motion until the return completion position in the shortest time while decelerating the spindle axis 12 at the maximum deceleration A0' so as to make the spindle axis stop at the return complete position. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, after the spindle axis 12 performs the accelerated inverse rotation at maximum capacity, the velocity control is executed in such a manner that, in accordance with the residual return-rotation amount Sr' and current speed Vc' of the spindle axis 12, the velocity command Cv' for the decelerated inverse rotation is successively updated and thereby the spindle axis 12 is made to perform the decelerated inverse rotation at the gradually increasing deceleration Ac' from the point C so that the residual return-rotation amount Sr' when reaching the intermediate return-rotation speed Vi' (=Vb) becomes equal to the positioning return-rotation amount Spos'. Accordingly, it is possible to smoothly switch the velocity control to the position control for decelerating the spindle axis 12 at maximum deceleration A0' from the point D without the aforementioned waiting time. Therefore, according to the controller 10, it is possible to further reduce the cycle time of a tapping process since the waiting time is not required to switch the velocity control to the position control during the decelerated inverse rotation of the spindle axis 12, and to reduce a mechanical or structural shock that may be caused on the spindle axis 12 due to change in the acceleration since the acute change in the acceleration at an instant when the velocity control is switched to the position control can be eliminated.

Figure 6:
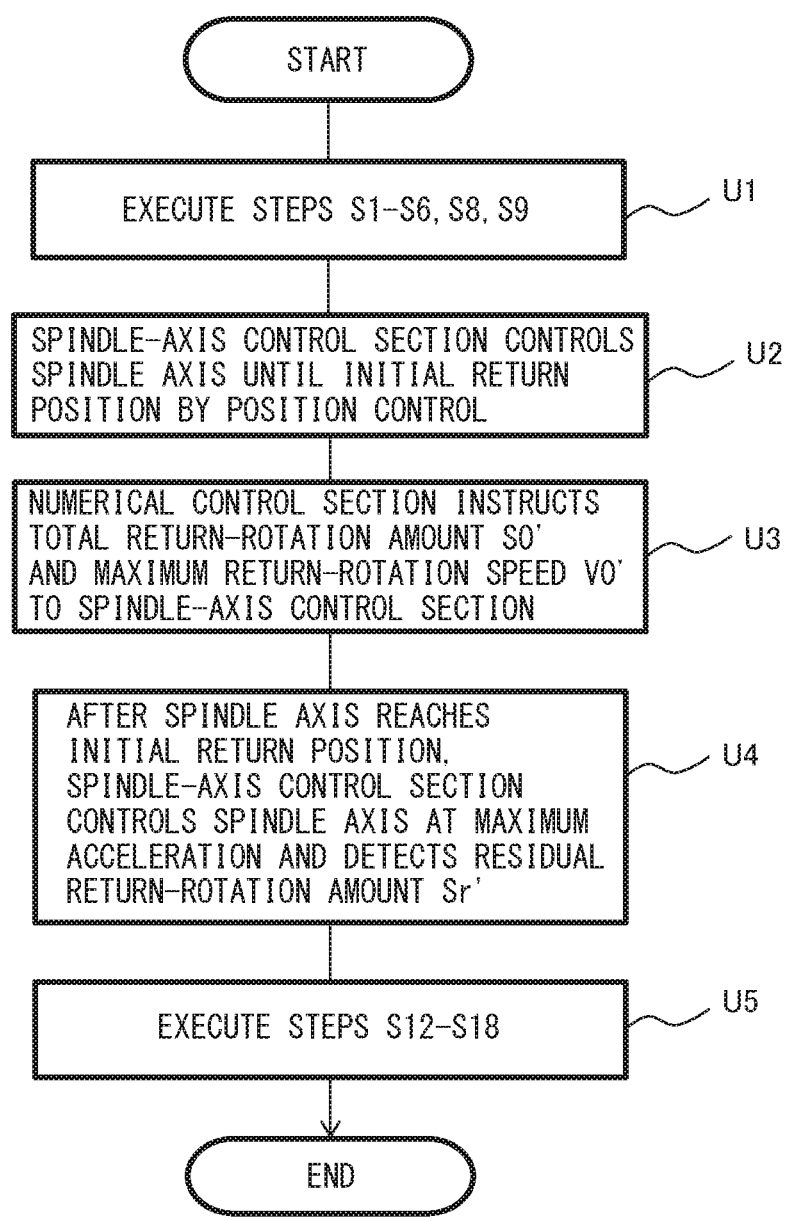
FIG. 6 is a flowchart for showing a cutting and return motion control method for a tapping process, which is another embodiment of a machine tool control method.
Figure 7:
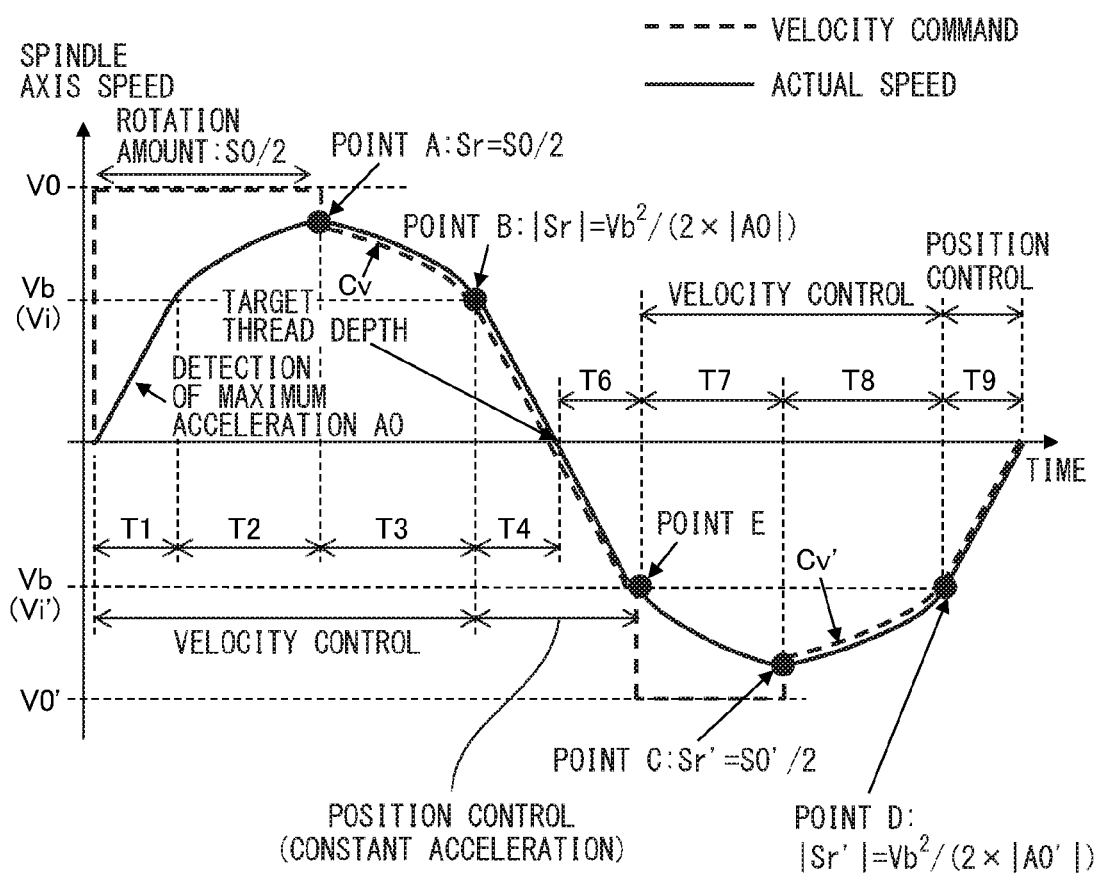
FIG. 7 is a diagram showing one example of the motion of the spindle axis in the embodiment of FIG. 6.
Figure 8:
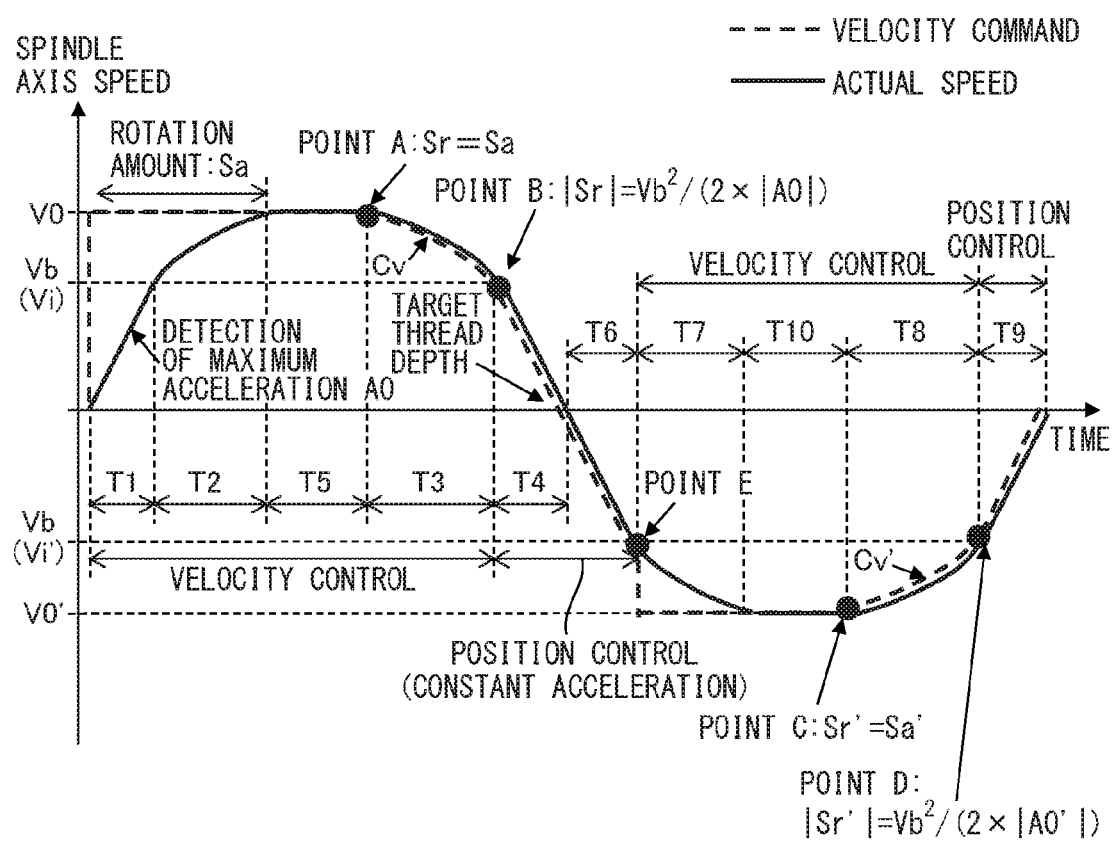
FIG. 8 is a diagram showing another example of the motion of the spindle axis in the embodiment of FIG. 6.

The controller 10 according to the embodiment shown in FIG. 1 is capable of executing a machine tool control method different from the aforementioned machine tool control method. FIG. 6 shows a cutting and return motion control method adapted to be performed for the spindle axis 12 in a tapping process, as the other embodiment of a machine tool control method executable by the controller 10. FIGS. 7 and 8 correspond respectively to FIGS. 3 and 4, and show two examples of the cutting and return motion of the spindle axis 12 in the embodiment shown in FIG. 6. With reference to FIGS. 1, 2, 5 to 8, the machine tool control method (the cutting and return motion control method in the tapping process) of another embodiment, as well as the configuration of the controller 10 executing this method, will be described below.

In summary, in the embodiment shown in FIGS. 6 to 8, the controller 10 executes several steps analogous to the steps in the cutting motion control method of the tapping process shown in FIG. 2, and thereby controls the cutting motion of the spindle axis 12, during a period when the spindle axis 12 is moved from the process start position (rotational position) to the target thread depth (rotational position). On the other hand, the spindle-axis control section 18 (the positioning-motion control section 40) of the controller 10 is configured not to make the spindle axis 12 stop at the target thread depth (i.e., not to set the acceleration to zero) at an instant when the spindle axis 12 reaches the target thread depth, but to make the spindle axis 12 perform an accelerated inverse rotation at maximum capacity until a predetermined rotational position (hereinafter referred to as an initial return position) at the maximum acceleration A0' (negative value) of inverse rotation, which is equal to the maximum deceleration A0 (negative value) in the decelerated rotation at maximum capacity. After making the spindle axis 12 perform the accelerated inverse rotation until the initial return position, the controller 10 executes several steps analogous to the steps in the return motion control method of the tapping process shown in FIG. 5, and thereby controls the return motion of the spindle axis 12. The configuration of this embodiment will be described in detail below. However, the description of components corresponding to those in the flowcharts of FIGS. 2 and 5 will be omitted as appropriate.

As shown in FIG. 6, the controller 10 first executes, at step U1, the processes of steps S1 to S5, S8 and S9 shown in FIG. 2. More specifically, the numerical control section 16 (the spindle-axis command outputting section 26) instructs the total rotation amount S0 and the maximum rotation speed V0, of the spindle axis 12, to the spindle-axis control section 18 (step S1). The spindle-axis control section 18 (the initial-motion control section 30, the maximum-acceleration detecting section 32 and the residual rotation-amount detecting section 34) makes the spindle axis 12 perform the accelerated rotation at maximum capacity to perform the cutting motion from the process start position, with the maximum rotation speed V0 set as a target speed, and detects the maximum acceleration A0 and the residual rotation amount Sr during the accelerated rotation (step S2). Thereafter, the spindle-axis control section 18 (the current-speed detecting section 36) sequentially detects the current speed Vc during the accelerated rotation at maximum capacity, and judges whether the current speed Vc has not reached the maximum rotation speed V0 (step S3). If Vc has not yet reached V0, the spindle-axis control section 18 judges whether the residual rotation amount Sr is equal to or less than one-half of the total rotation amount S0 (step S4). If Sr is equal to or less than one-half of S0, the spindle-axis control section 18 (the decelerating-motion control section 38) makes the spindle axis 12 perform the decelerated rotation until the intermediate rotation speed Vi (=Vb), so as to continuously perform the cutting motion (step S5). On the other hand, if it is judged that the current speed Vc has reached the maximum rotation speed V0 (step S3), the spindle-axis control section 18 stores a rotation amount (i.e., a rotational position FBS) of the spindle axis 12 from the process start position at an instant when the spindle axis 12 reaches the maximum rotation speed V0, as the acceleration rotation amount Sa (step S8), and judges whether the residual rotation amount Sr is equal to or less than the acceleration rotation amount Sa (step S9). If Sr is equal to or less than Sa, the spindle-axis control section 18 (the decelerating-motion control section 38) makes the spindle axis 12 perform the decelerated rotation until the intermediate rotation speed Vi (=Vb), so as to continuously perform the cutting motion (step S5). Thereafter, the spindle-axis control section 18 (the positioning-motion control section 40) judges whether the residual rotation amount Sr of the spindle axis 12 at the current position satisfies the equation 1: $|Sr|=Vb^2/(2\times|A0|)$ (step S6).

Referring now to FIG. 7, one example of the cutting motion of the spindle axis 12, in the case where the residual rotation amount Sr reaches one-half of the total rotation amount S0 before the current speed Vc reaches the maximum rotation speed V0 during the cutting motion at step U1 of FIG. 6 (i.e., in the case where the judgment results at respective steps S3 and S4 of FIG. 2 are YES), is depicted by a speed-time curve (the curve above a time axis). The motions of the spindle axis 12 in time periods T1, T2, T3 and T4 in the speed-time curve of FIG. 7 correspond to the motions of the spindle axis 12 in time periods T1, T2, T3 and T4 in the aforementioned speed-time curve of FIG. 3. More specifically, as shown in FIG. 7, the accelerated rotation of the spindle axis 12 at maximum capacity (by a velocity control) is performed during the time periods T1 and T2; then at the time point A when the residual rotation amount Sr reaches one-half of the total rotation amount S0 (i.e., when the judgment result at step S4 becomes YES), the motion of the spindle axis 12 changes from the accelerated rotation to the decelerated rotation; thereafter, the decelerated rotation of the spindle axis 12 at gradually increasing deceleration Ac (by a velocity control) is performed in the time period T3; and thereafter, the decelerated rotation of the spindle axis 12 at maximum deceleration A0 (by a position control) is performed in the time period T4.

With the controller 10 performs step U1 (especially, steps S1 to S2 to S3 to S4 to S5 to S6 of FIG. 2 in this order), the spindle axis 12 operates, in the time periods T1, T2 and T3 shown in FIG. 7, in the same way as the operation in the time periods T1, T2 and T3 shown in FIG. 3. If the spindle-axis control section 18 (the positioning-motion control section 40) judges that the residual rotation amount Sr of the spindle axis 12 satisfies the aforementioned equation 1 at step U1 (step S6 of FIG. 2), the spindle-axis control section 18 (the positioning-motion control section 40) prepares, at step U2 of FIG. 6 instead of step 7 of FIG. 2, a command for making the spindle axis 12 perform the decelerated rotation at the maximum deceleration A0 so as to reach the point of Sr=0 (i.e., the target thread depth) and subsequently perform the accelerated inverse rotation until the initial return position (i.e., time point E shown in FIG. 7) at the maximum acceleration A0' of inverse rotation, identical to the maximum deceleration A0 (i.e., A0=A0'), and executes a position control for the spindle axis 12 with use of the prepared command.

As shown in FIG. 7, the spindle axis 12 performs, in accordance with the command from the spindle-axis control section 18 (the positioning-motion control section 40), the cutting motion from the point B toward the target thread depth while performing the decelerated rotation at the maximum deceleration A0, and reaches the target thread depth when Sr becomes equal to zero (in the time period T4). At the moment the spindle axis 12 reaches the target thread depth, the current speed Vc of the spindle axis 12 becomes equal to zero, but the spindle axis 12 further operates, in accordance with the command from the spindle-axis control section 18 (the positioning-motion control section 40), to maintain the maximum deceleration A0 and generate the maximum acceleration A0' of inverse rotation, and performs a return motion from the target thread depth toward the point E over the time period T6 by the accelerated inverse rotation for gradually increasing the current speed Vc (negative value). In this way, in the time period T4 in which the spindle axis operates from the point B to reach the target thread depth and in the time period T6 in which the spindle axis operates from the target thread depth to reach the point E, the spindle-axis control section 18 executes a position control for the spindle axis 12 (step U2) and continuously moves the spindle axis 12 at a constant acceleration (i.e., the maximum deceleration A0 and the maximum acceleration A0') (a velocity command at the constant acceleration, obtained from a position command, is shown by a broken line). Note that, although the current speed Vc of the spindle axis 12 becomes zero at the target thread depth, this is a momentary phenomenon, and thus should not be considered as to stop at the target thread depth.

The initial return position (point E) of the spindle axis 12 can be set arbitrarily. For example, as shown in FIG. 7, the point E may be set at a position at which the current speed Vc' of inverse rotation of the spindle axis 12 reaches the predetermined speed Vb, in the same way as the point B at which the decelerated rotation at the maximum deceleration A0 (by the position control) starts during the cutting motion. In this configuration, the position of the point E is considered as a position where the spindle axis reaches by performing the inverse rotation from the target thread depth by a rotation amount corresponding to $|Sr|=Vb^2/(2\times|A0|)$. The return motion of spindle axis 12 by the position control in the time period T6 is analogous to the return motion of spindle axis 12 by the velocity control in the time period T6 shown in FIG. 3. However, because of control characteristics, the maximum deceleration A0 (in the time period T4) during the decelerated rotation at maximum capacity by the position control tends to be slightly suppressed in comparison to the maximum acceleration A0 (in the time period T1) during the accelerated rotation at maximum capacity by the velocity control, and as a result, the maximum acceleration A0' of inverse rotation in the time period T6 also tends to be slightly lowered in comparison to the maximum acceleration A0 in the time period T1.

On the other hand, referring to FIG. 8, one example of the cutting motion of the spindle axis 12, in the case where the current speed Vc reaches the maximum rotation speed V0 before the residual rotation amount Sr reaches one-half of the total rotation amount S0 during the cutting motion at step U1 of FIG. 6 (i.e., in the case where the judgment result at step S3 of FIG. 2 is NO), is depicted by a speed-time curve (the curve above a time axis). The motions of the spindle axis 12 in time periods T1, T2, T5, T3 and T4 in the speed-time curve of FIG. 8 correspond to the motions of the spindle axis 12 in time periods T1, T2, T5, T3 and T4 in the aforementioned speed-time curve of FIG. 4. More specifically, as shown in FIG. 8, the accelerated rotation of the spindle axis 12 at maximum capacity (by a velocity control) is performed during the time periods T1 and T2, so that the current speed Vc of the spindle axis 12 reaches the maximum rotation speed V0; thereafter, the spindle axis 12 rotates at the constant speed V0 over the time period T5 so as to continue the cutting motion; then at the time point A when the residual rotation amount Sr becomes equal to the acceleration rotation amount Sa (i.e., when the judgment result at step S9 becomes YES), the motion of the spindle axis 12 changes from the accelerated rotation to the decelerated rotation; thereafter, the decelerated rotation of the spindle axis 12 at gradually increasing deceleration Ac (by a velocity control) is performed in the time period T3; and thereafter, the decelerated rotation of the spindle axis 12 at maximum deceleration A0 (by a position control) is performed in the time period T4.

With the controller 10 performs step U1 (especially, steps S1 to S2 to S3 to S8 to S9 to S5 to S6 in FIG. 2 in this order), the spindle axis 12 operates, in the time periods T1, T2, T5 and T3 shown in FIG. 8, in the same way as the operation in the time periods T1, T2, T5 and T3 shown in FIG. 4. If the spindle-axis control section 18 (the positioning-motion control section 40) judges that the residual rotation amount Sr of the spindle axis 12 satisfies the aforementioned equation 1 at step U1 (step S6 of FIG. 2), the spindle-axis control section 18 (the positioning-motion control section 40) prepares, at step U2 of FIG. 6 instead of step 7 of FIG. 2, a command for making the spindle axis 12 perform the decelerated rotation at the maximum deceleration A0 so as to reach the point of Sr=0 (i.e., the target thread depth) and subsequently perform the accelerated inverse rotation until the initial return position (i.e., time point E shown in FIG. 8) at the maximum acceleration A0' of inverse rotation, identical to the maximum deceleration A0 (i.e., A0=A0'), and executes a position control for the spindle axis 12 with use of the prepared command.

As shown in FIG. 8, the spindle axis 12 performs, in accordance with the command from the spindle-axis control section 18 (the positioning-motion control section 40), the cutting motion from the point B toward the target thread depth while performing the decelerated rotation at the maximum deceleration A0, and reaches the target thread depth when Sr becomes equal to zero (in the time period T4). At the moment the spindle axis 12 reaches the target thread depth, the current speed Vc of the spindle axis 12 becomes equal to zero, but the spindle axis 12 further operates, in accordance with the command from the spindle-axis control section 18 (the positioning-motion control section 40), to maintain the maximum deceleration A0 and generate the maximum acceleration A0' of inverse rotation, and performs a return motion from the target thread depth toward the point E over the time period T6 by the accelerated inverse rotation for gradually increasing the current speed Vc (negative value). In this way, in the time period T4 in which the spindle axis operates from the point B to reach the target thread depth and in the time period T6 in which the spindle axis operates from the target thread depth to reach the point E, the spindle-axis control section 18 executes a position control for the spindle axis 12 (step U2) and continuously moves the spindle axis 12 at a constant acceleration (i.e., the maximum deceleration A0 and the maximum acceleration A0') (a velocity command at the constant acceleration, obtained from a position command, is shown by a broken line). Thus, the motion of the spindle axis 12 in the time periods T4 and T6 shown in FIG. 8 corresponds to the motion of the spindle axis 12 in the time periods T4 and T6 shown in FIG. 7.

In the motion examples shown in FIGS. 7 and 8, during a period when the spindle-axis control section 18 controls the rotational motion of the spindle axis 12 from the process start position to the target thread depth, the feed-axis control section 22 controls the feed axis 14 so as to perform a feed motion while following the motion of the spindle axis 12, with use of the rotational position FBS of the spindle axis 12. During a period when the spindle-axis control section 18 executes the aforementioned processes of step U1 and step U2, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero). After it is judged that the tapping process has reached the target thread depth, the numerical control section 16 (the spindle-axis command outputting section 26) obtains, at step U3 (FIG. 6) and concurrently with step U2, the total return-rotation amount S0' and the maximum return-rotation speed V0', of the spindle axis 12, during a period when the spindle axis operates from the target thread depth to the return completion position, from a command value provided in the tapping program P interpreted by the program interpreting section 24, and sends the total return-rotation amount S0' and the maximum return-rotation speed V0' as the spindle axis command CS to the spindle-axis control section 18.

After the spindle axis 12 has reached the initial return position (point E), the spindle-axis control section 18 (the initial-motion control section 30) makes, at step U4 (FIG. 6), the spindle axis 12 perform an accelerated inverse rotation at maximum capacity using the maximum permissible current of the drive source, from the initial return position (point E) toward the return completion position, with the maximum return-rotation speed V0' set as a target speed, so as to perform the return motion. The spindle-axis control section 18 (the residual rotation-amount detecting section 34) sequentially detects a residual return-rotation amount Sr' of the spindle axis 12 during a period when the spindle axis operates from a current position to the return completion position, based on the total return-rotation amount S0' and the rotational position FBS. The spindle-axis control section 18 notifies the detected residual return-rotation amount Sr' to the numerical control section 16 every time it is detected. In this embodiment, the maximum-acceleration detecting section 32 does not detect a maximum acceleration of inverse rotation of the spindle axis 12 during the time period T6, but obtains the maximum deceleration A0 in the decelerated rotation at maximum capacity during the time period T4 (which corresponds to the maximum acceleration A0 during the time period T1) as the maximum acceleration A0' of inverse rotation of the spindle axis 12 performing the accelerated inverse rotation from the target thread depth.

Next, the controller 10 executes, at step U5 (FIG. 6), the processes of steps S12 to S18 shown in FIG. 5. More specifically, the spindle-axis control section 18 (the current-speed detecting section 36) sequentially detects the current speed Vc' of inverse rotation based on the rotational position FBS during the accelerated inverse rotation at maximum capacity, and judges whether the current speed Vc' has not reached the maximum return-rotation speed V0' (step S12). If Vc' has not reached V0', the spindle-axis control section 18 judges whether the residual return-rotation amount Sr' is equal to or less than one-half of the total return-rotation amount S0' (step S13). If Sr' is equal to or less than one-half of S0', the spindle-axis control section 18 (the decelerating-motion control section 38) makes the spindle axis 12 perform the decelerated inverse rotation until the intermediate return-rotation speed Vi' (=Vb), so as to continuously perform the return motion (step S14). On the other hand, if it is judged that the current speed Vc' has reached the maximum return-rotation speed V0' (step 12), the spindle-axis control section 18 stores a rotation amount of the spindle axis 12 from the target thread depth (i.e., a rotational position FBS) at an instant when the spindle axis reaches the maximum return-rotation speed V0', as the acceleration rotation amount Sa' of the return motion (step S17), and judges whether the residual return-rotation amount Sr' is equal to or less than the acceleration rotation amount Sa' (step S18). If Sr' is equal to or less than Sa', the spindle-axis control section 18 makes the spindle axis 12 perform the decelerated inverse rotation until the intermediate return-rotation speed Vi' (=Vb), so as to continuously perform the return motion (step S14). Thereafter, the spindle-axis control section 18 (the positioning-motion control section 40) judges whether the residual return-rotation amount Sr' of the spindle axis 12 at the current position satisfies the equation 2: $|Sr'|=Vb^2/(2\times|A0'|)$ (step S15). If the equation 2 is satisfied, the spindle-axis control section 18 (the positioning-motion control section 40) prepares a command for making the spindle axis 12 perform the decelerated inverse rotation at the maximum deceleration A0' (corresponding to the maximum acceleration A0' of inverse rotation in the time period T6) and reach the point of Sr'=0 (i.e., the return completion position), and executes a position control for the spindle axis 12 with use of the prepared command. The spindle axis 12 performs the return motion toward the return completion position, in accordance with the command from the spindle-axis control section 18 (the positioning-motion control section 40), by performing the decelerated inverse rotation at maximum deceleration A0', and stops at an instant when Sr' becomes equal to zero.

Referring now to FIG. 7, one example of the return motion of the spindle axis 12, in the case where the residual return-rotation amount Sr' reaches one-half of the total return-rotation amount S0' before the current speed Vc' of inverse rotation reaches the maximum return-rotation speed V0' at step U5 of FIG. 6 (i.e., in the case where the judgment results at respective steps S12 and S13 of FIG. 5 are YES), is depicted by a speed-time curve (the curve below a time axis). The motions of the spindle axis 12 in time periods T7, T8 and T9 in the speed-time curve of FIG. 7 correspond to the motions of the spindle axis 12 in time periods T7, T8 and T9 in the aforementioned speed-time curve of FIG. 3. In the motion example of FIG. 7, after the spindle axis 12 moves from the target thread depth to reach the initial return position (point E) during the time period T6, the current speed Vc' of inverse rotation of the spindle axis 12 exceeds Vb (negative value), so that the acceleration of inverse rotation of the spindle axis 12 in the accelerated inverse rotation at maximum capacity gradually decreases from the maximum acceleration A0' due to the characteristics of the spindle motor (in the time period T7). At a time point C when the residual return-rotation amount Sr' reaches one-half of the total return-rotation amount S0' (i.e., when the judgment result at step S13 of FIG. 5 becomes YES), the motion of the spindle axis 12 changes from the accelerated inverse rotation to the decelerated inverse rotation; thereafter, the decelerated inverse rotation of the spindle axis 12 at gradually increasing deceleration Ac' (by a velocity control) is performed in the time period T8; and thereafter, the decelerated inverse rotation of the spindle axis 12 at maximum deceleration A0' (by a position control) is performed in the time period T9.

On the other hand, referring to FIG. 8, one example of the return motion of the spindle axis 12, in the case where the current speed Vc' of inverse rotation reaches the maximum return-rotation speed V0' before the residual return-rotation amount Sr' reaches one-half of the total return-rotation amount S0' at step U5 of FIG. 6 (i.e., in the case where the judgment result at step S12 of FIG. 5 is NO), is depicted by a speed-time curve (the curve below a time axis). The motions of the spindle axis 12 in time periods T7, T10, T8 and T9 in the speed-time curve of FIG. 8 correspond to the motions of the spindle axis 12 in time periods T7, T10, T8 and T9 in the aforementioned speed-time curve of FIG. 4. In the motion example of FIG. 8, during the time period T7 after the spindle axis 12 reaches the initial return position (point E), the accelerated inverse rotation of the spindle axis 12 at maximum capacity by the gradually decreasing acceleration A0' is performed in a way similar to the motion example of FIG. 7, so that the current speed Vc' of the spindle axis 12 reaches the maximum return-rotation speed V0'. Thereafter, the spindle axis 12 inversely rotates at the constant speed V0' over the time period T10 so as to continue the return motion. At a time point C when the residual return-rotation amount Sr' becomes equal to the acceleration rotation amount Sa' (i.e., when the judgment result at step S18 of FIG. 5 becomes YES), the motion of the spindle axis 12 changes from the accelerated inverse rotation to the decelerated inverse rotation; thereafter, the decelerated inverse rotation of the spindle axis 12 at gradually increasing deceleration Ac' (by a velocity control) is performed in the time period T8; and thereafter, the decelerated inverse rotation of the spindle axis 12 at maximum deceleration A0' (by a position control) is performed in the time period T9.

In the motion examples shown in FIGS. 7 and 8, during a period when the spindle-axis control section 18 controls the inverse rotational motion of the spindle axis 12 from the target thread depth to the return completion position, the feed-axis control section 22 controls the feed axis 14 so as to perform an inverse feed motion while following the motion of the spindle axis 12, with use of the rotational position FBS of the spindle axis 12. During a period when the spindle-axis control section 18 executes the aforementioned processes from step U3 to step U5, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

The controller 10 according to the embodiment depicted in FIGS. 6 to 8 has a configuration analogous to the configuration of the controller 10 according to the embodiment of FIGS. 1 to 5, i.e., a configuration wherein, when the spindle axis 12 is made to perform the cutting motion from the process start position to the target thread depth, the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the maximum acceleration A0 during the accelerating step and the sequentially detected residual rotation amount Sr and current speed Vc of the spindle axis 12, the cutting motion until the target thread depth in the shortest time while decelerating the spindle axis 12 at the maximum deceleration A0 so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, after the spindle axis 12 performs the accelerated rotation at maximum capacity, the velocity control is executed in such a manner that, in accordance with the residual rotation amount Sr and current speed Vc of the spindle axis 12, the velocity command Cv for the decelerated rotation is successively updated and thereby the spindle axis 12 is made to perform the decelerated rotation at the gradually increasing deceleration Ac from the point A so that the residual rotation amount Sr when reaching the intermediate rotation speed Vi (=Vb) becomes equal to the positioning rotation amount Spos. Accordingly, it is possible to smoothly switch the velocity control to the position control for decelerating the spindle axis 12 at maximum deceleration A0 from the point B without the aforementioned waiting time. Therefore, according to the controller 10, it is possible to further reduce the cycle time of a tapping process since the waiting time is not required to switch the velocity control to the position control during the decelerated rotation of the spindle axis 12, and to reduce a mechanical or structural shock that may be caused on the spindle axis 12 due to change in the acceleration since the acute change in the acceleration at an instant when the velocity control is switched to the position control can be eliminated.

Moreover, the controller 10 according to the embodiment shown in FIGS. 6 to 8 has a configuration wherein, when the spindle axis 12 is made perform the return motion from the target thread depth to the return completion position, the spindle axis 12 is not made stop at the target thread depth (i.e., the acceleration is not set to zero) at the completion of the cutting motion, but is made perform the accelerated inverse rotation until the predetermined initial return position by the position control, at the maximum acceleration A0' (negative value) of inverse rotation, which is equal to the maximum deceleration A0 (negative value). According to this configuration, the acceleration of the spindle axis 12 is not changed at an instant when the operation of the spindle axis 12 is changed from the cutting motion to the return motion, so that it is possible to avoid a mechanical or structural shock that may be caused on the spindle axis 12 due to the change in the acceleration as well as an increase of synchronization error that may be caused between the spindle axis 12 and the feed axis 14 due to the change in the acceleration.

In the controller 10 according to the embodiment depicted in FIGS. 6 to 8 has a configuration wherein, after the spindle axis 12 is made to perform the accelerated inverse rotation until the initial return position by the position control, the return motion is performed by accelerating the spindle axis 12 with the maximum power in accordance with the spindle axis command CS including only the total return-rotation amount S0' and maximum return-rotation speed V0' of the spindle axis 12, notified by the numerical control section 16 to the spindle-axis control section 18, and the return motion until the return completion position is continuously performed in the shortest time while decelerating the spindle axis 12 at the maximum deceleration A0' corresponding to the maximum acceleration A0' of inverse rotation just after the inversion of the motion so as to make the spindle axis stop at the return complete position. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Figure 9:
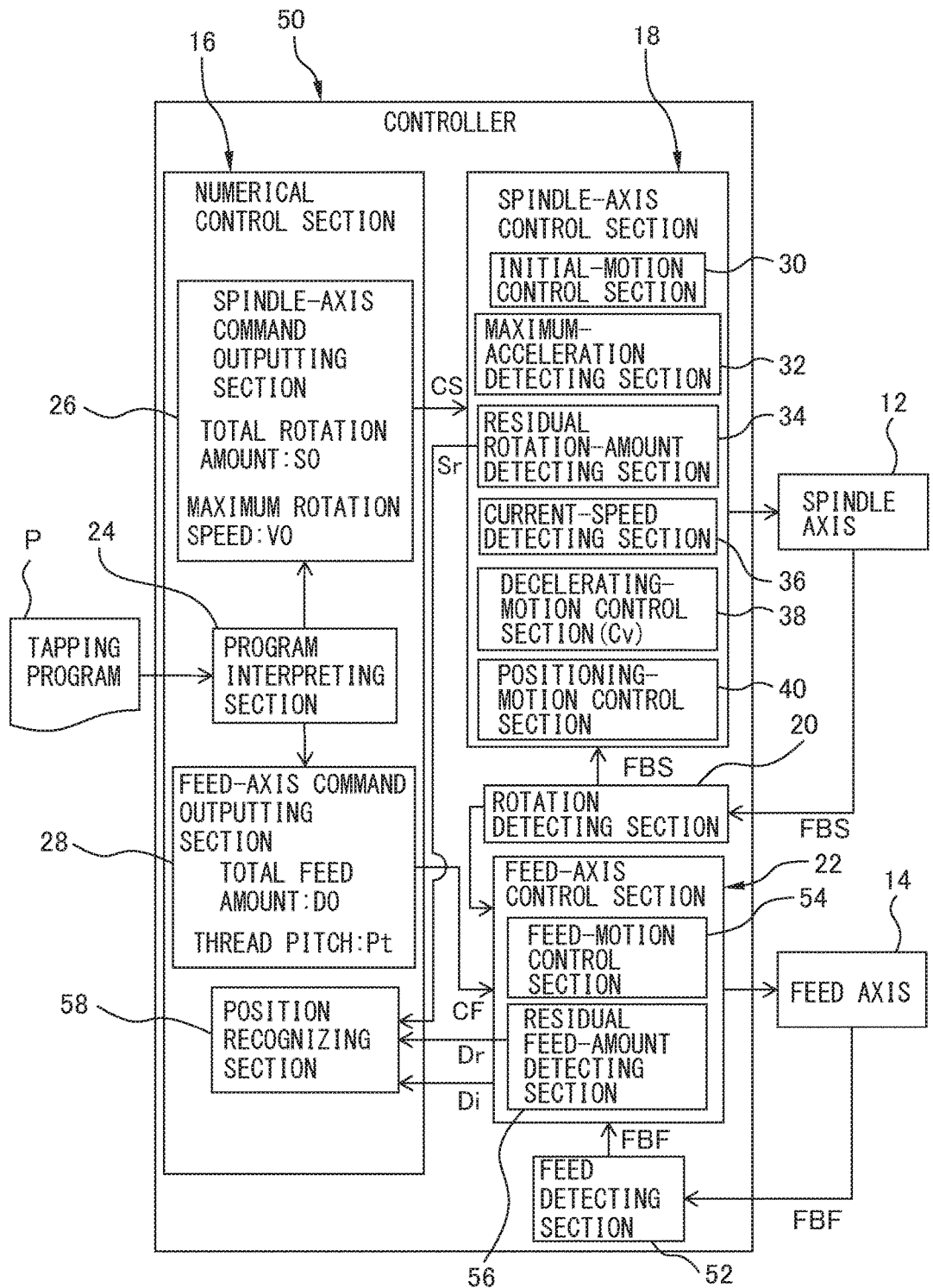
FIG. 9 is a functional block diagram showing the configuration of a modified example of the controller of FIG. 1.

In the meantime, in a tapping process using a machine tool, it is preferable that a controller continuously grasps a rotational position of a spindle axis and a feed position of a feed axis during the tapping process. FIG. 9 depicts a functional block diagram of a configuration of a controller 50 according to a modified example, in which a function of recognizing the positions of the spindle axis and the feed axis is added. The configuration of the controller 50 is substantially identical to the configuration of the controller 10 in FIG. 1, except that the position recognizing function is added, and therefore, mutually corresponding components are denoted by the same reference numerals and the detailed descriptions thereof are not repeated.

The controller 50 includes a numerical control section 16 configured to prepare a spindle-axis command CS and a feed-axis command CF based on a tapping program P; a spindle-axis control section 18 configured to control a rotational motion of a spindle axis 12 in accordance with the spindle-axis command CS; a rotation detecting section 20 configured to detect a rotational position of the spindle axis 12; a feed-axis control section 22 configured to control a feed motion of a feed axis 14 in accordance with the feed-axis command CF, based on the rotational position detected by the rotation detecting section 20; and a feed detecting section 52 configured to detect the feed position of the feed axis 14. A feed-axis command outputting section 28 of the numerical control section 16 obtains, before starting a tapping process, a total feed amount D0 (mm) and a thread pitch Pt (mm/rev), of the feed axis 14 during a period when the feed axis operates from a process start position to a target thread depth, from a command value provided in the tapping program P interpreted by a program interpreting section 24, and sends the total feed amount D0 and the thread pitch Pt as the feed-axis command CF to the feed-axis control section 22. In this way, the feed-axis command CF does not include a position command and/or an acceleration/deceleration command, which makes the feed axis 14 perform a feed motion until the target thread depth.

The feed-axis control section 22 includes a feed-motion control section 54 configured to control the feed motion of the feed axis 14, based on the rotational position FBS of the spindle axis 12 detected by the rotation detecting section 20, the thread pitch Pt and the feed position FBF (i.e., a feedback value) of the feed axis 14 detected by the feed detecting section 52; and a residual feed-amount detecting section 56 configured to detect a residual feed amount Dr of the feed axis 14 during a period when the feed axis operates from the current position to the target thread depth, based on the total feed amount D0 and the feed position FBF. The feed detecting section 52 can obtain the feed position FBF from the output of a position detector (not shown), such as an encoder, etc., for detecting the operating position of the drive unit of the feed axis 14.

The residual rotation-amount detecting section 34 of the spindle-axis control section 18 sequentially detects the residual rotation amount Sr of the spindle axis 12 from the current position during a period when the spindle axis 12 is made to perform a cutting motion from the process start position to the target thread depth, and notifies the residual rotation amount Sr to the numerical control section 16 every time it is detected. The residual feed-amount detecting section 56 of the feed-axis control section 22 sequentially detects the residual feed amount Dr of the feed axis 14 from the current position during a period when the feed axis 14 is made to perform a feed motion from the process start position to the target thread depth, and notifies the residual feed amount Dr to the numerical control section 16 every time it is detected. Further, the feed-axis control section 22 notifies an initial position Di (feed position FBF) of the feed axis 14 at the start of processing to the numerical control section 16.

The numerical control section 16 includes a position recognizing section 58 configured to recognize the current position of the spindle axis 12 based on the residual rotation amount Sr, and also recognize the current position of the feed axis 14 based on the residual feed amount Dr. The position recognizing section 58 recognizes the current position of the spindle axis 12 as (S0−Sr) with use of the total rotation amount S0 of the spindle axis 12 obtained from the tapping program P and the residual rotation amount Sr of the spindle axis 12 notified from the spindle-axis control section 18. The position recognizing section 58 also recognizes the current position of the feed axis 14 as (D0−Dr+Di) with use of the total feed amount D0 of the feed axis 14 obtained from the tapping program P and the residual feed amount Dr and initial position Di of the feed axis 14 notified from the feed-axis control section 22.

In the controller 50 having the above configuration, the position recognizing section 58 of the numerical control section 16 is capable of recognizing the current positions of the spindle axis 14 and feed axis 14, even in the configuration wherein the spindle-axis command CS prepared by the numerical control section 16 does not include either a position command or an acceleration/deceleration command for the spindle axis 12 and the feed-axis command CF prepared by the numerical control section 16 does not include either a position command or an acceleration/deceleration command for the feed axis 14. Therefore, according to the controller 50, the numerical control section 16, as a higher-level controller relative to the spindle-axis control section 18 and the feed-axis control section 22 both performing a feedback control, is capable of constantly grasping or managing the operating states of the spindle axis 12 and the feed axis 14 during execution of the tapping process, and thereby it is possible to improve the reliability of a tapping process control.

In the controller 50, during a period when a return motion of the tapping process is controlled, the position recognizing section 58 of the numerical control section 16 is also capable of recognizing the current positions of the spindle axis 12 and the feed axis 14 in an analogous manner. In this configuration, at the instant when the numerical control section 16 judges that the tapping process has reached the target thread depth, the feed-axis command outputting section 28 obtains a total return-feed amount D0' (mm) and a thread pitch Pt (mm/rev), of the feed axis 14 during a period when the feed axis operates from the target thread depth to a return completion position, from a command value provided in the tapping program P interpreted by the program interpreting section 24, and sends the total return-feed amount D0' and the thread pitch Pt as the feed axis command CF to the feed-axis control section 22. Usually, the total return-feed amount D0' is identical to the total feed amount D0.

The feed-motion control section 54 of the feed-axis control section 22 controls a return-feed motion of the feed axis 14, based on the rotational position FBS of return motion of the spindle axis 12, the thread pitch Pt and the feed position FBF of return motion of the feed axis 14. The residual feed-amount detecting section 56 of the feed-axis control section 22 detects a residual return-feed amount Dr' of the feed axis 14 during a period when the feed axis operates from the current position to the return completion position, based on the total return-feed amount D0' and the feed position FBF. The residual rotation-amount detecting section 34 of the spindle-axis control section 18 sequentially detects the residual return-rotation amount Sr' of the spindle axis 12 from the current position during a period when the spindle axis 12 is made to perform a return motion from the target thread depth to the return completion position, and notifies the residual return-rotation amount Sr' to the numerical control section 16 every time it is detected. The residual feed-amount detecting section 56 of the feed-axis control section 22 sequentially detects the residual return-feed amount Dr' of the feed axis 14 from the current position during a period when the feed axis 14 is made to perform a return-feed motion from the target thread depth to the return completion position, and notifies the residual return-feed amount Dr' to the numerical control section 16 every time it is detected. Further, the feed-axis control section 22 notifies an initial position Di' (feed position FBF) of the feed axis 14 at the start of return motion to the numerical control section 16. The position recognizing section 58 of the numerical control section 16 recognizes the current position (S0'−Sr') of the spindle axis 12 with use of the total return-rotation amount S0' and residual return-rotation amount Sr' of the spindle axis 12, and also recognizes the current position (D0'−Dr'+Di') of the feed axis 14 with use of the total return-feed amount D0', residual return-feed amount Dr' and initial position Di' of the feed axis 14.

Figure 10:
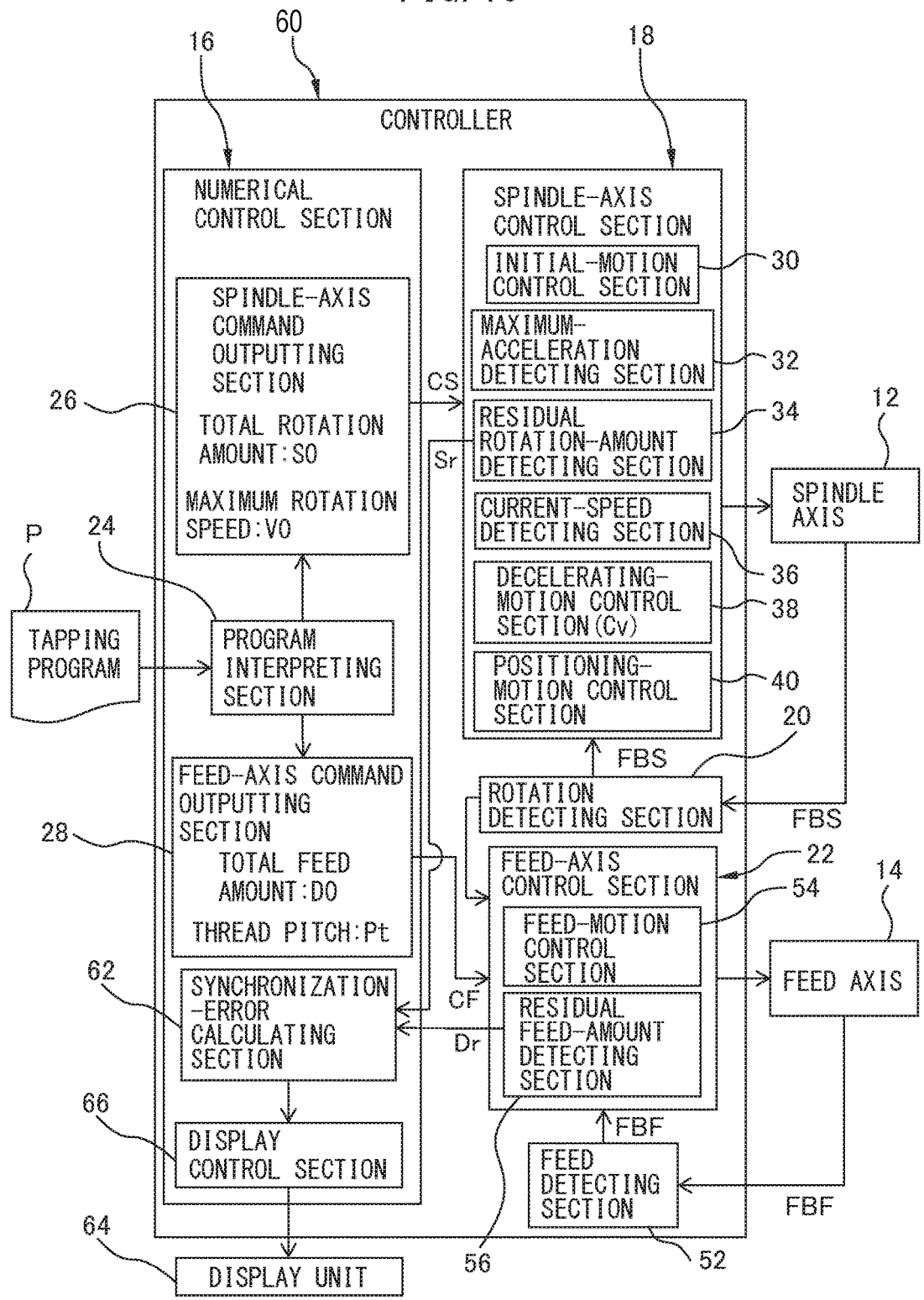
FIG. 10 is a functional block diagram showing the configuration of another modified example of the controller of FIG. 1.

In a tapping process using a machine tool, it is preferable that a controller continuously grasps a synchronization error between a spindle axis and a feed axis during the tapping process. FIG. 10 depicts a functional block diagram of a configuration of a controller 60 according to a modified example, in which a function of recognizing the synchronization error between the spindle axis and the feed axis is added. The configuration of the controller 60 is substantially identical to the configuration of the controller 10 in FIG. 1, except that the synchronization error recognizing function is added, and therefore, mutually corresponding components are denoted by the same reference numerals and the detailed descriptions thereof are not repeated.

The controller 60 includes a numerical control section 16 configured to prepare a spindle-axis command CS and a feed-axis command CF based on a tapping program P; a spindle-axis control section 18 configured to control a rotational motion of the spindle axis 12 in accordance with the spindle-axis command CS; a rotation detecting section 20 configured to detect a rotational position of the spindle axis 12; a feed-axis control section 22 configured to control a feed motion of the feed axis 14 in accordance with the feed-axis command CF, based on the rotational position detected by the rotation detecting section 20; and a feed detecting section 52 configured to detect the feed position of the feed axis 14. A feed-axis command outputting section 28 of the numerical control section 16 obtains, before starting a tapping process, a total feed amount D0 (mm) and a thread pitch Pt (mm/rev), of the feed axis 14 during a period when the feed axis operates from a process start position to a target thread depth, from a command value provided in the tapping program P interpreted by a program interpreting section 24, and sends the total feed amount D0 and the thread pitch Pt as the feed-axis command CF to the feed axis control section 22. In this way, the feed-axis command CF does not include a position command and/or an acceleration/deceleration command, which makes the feed axis 14 perform a feed motion until the target thread depth.

The feed-axis control section 22 includes a feed-motion control section 54 configured to control the feed motion of the feed axis 14, based on the rotational position FBS of the spindle axis 12 detected by the rotation detecting section 20, the thread pitch Pt and the feed position FBF (i.e., a feedback value) of the feed axis 14 detected by the feed detecting section 52; and a residual feed-amount detecting section 56 configured to detect a residual feed amount Dr of the feed axis 14 during a period when the feed axis operates from the current position to the target thread depth, based on the total feed amount D0 and the feed position FBF. The residual rotation-amount detecting section 34 of the spindle-axis control section 18 sequentially detects the residual rotation amount Sr of the spindle axis 12 from the current position during a period when the spindle axis 12 is made to perform a cutting motion from the process start position to the target thread depth, and notifies the residual rotation amount Sr to the numerical control section 16 every time it is detected. The residual feed-amount detecting section 56 of the feed-axis control section 22 sequentially detects the residual feed amount Dr of the feed axis 14 from the current position during a period when the feed axis 14 is made to perform a feed motion from the process start position to the target thread depth, and notifies the residual feed amount Dr to the numerical control section 16 every time it is detected.

The numerical control section 16 includes a synchronization-error calculating section 62 configured to calculate a synchronization error in the synchronized operation of the spindle axis 12 and the feed axis 14, based on the residual rotation amount Sr, the residual feed amount Dr and the thread pitch Pt. The synchronization-error calculating section 62 calculates the synchronization error E between the spindle axis 12 and the feed axis 14 by the following equation, with use of the residual rotation amount Sr (rev) of the spindle axis 12 notified from the spindle-axis control section 18, the residual feed amount Dr (mm) of the feed axis 14 notified from the feed axis control section 22 and the thread pitch Pt (mm/rev).

In a case where the synchronization error E is calculated in terms of the rotation amount of the spindle axis 12:

$$E\ (\text{rev})=Sr-Dr/Pt$$

In a case where the synchronization error E is calculated in terms of the feed amount of the feed axis 14:

$$E\ (\text{mm})=Sr\times Pt-Dr$$

In the controller 60 having the above configuration, the synchronization error calculating section 62 of numerical control section 16 is capable of determining the synchronization error E between the spindle axis 12 and the feed axis 14, even in the configuration wherein the numerical control section 16 does not perform a feedback control for the spindle axis 12 and the feed axis 14. Therefore, according to the controller 60, the numerical control section 16, as a higher-level controller relative to the spindle-axis control section 18 and the feed-axis control section 22 both performing a feedback control, is capable of constantly grasping or managing the synchronization error E between the spindle axis 12 and the feed axis 14 during execution of the tapping process, and thereby it is possible to improve the reliability of a tapping process control.

The numerical control section 16 of the controller 60 may include a display controlling section 66 configured to make a display unit 64 display the synchronization error E determined by the synchronization-error calculating section 62.

According to this configuration, it is possible for an operator to sequentially check the synchronization error E, and therefore to quickly take measure in consideration of the synchronization error E.

In the controller 60, during a period when a return motion of the tapping process is controlled, the synchronization-error calculating section 62 of the numerical control section 16 is also capable of calculating the synchronization error E between the spindle axis 12 and the feed axis 14 in an analogous manner. In this configuration, at an instant when the numerical control section 16 judges that the tapping process has reached the target thread depth, the feed-axis command outputting section 28 obtains a total return-feed amount D0' (mm) and a thread pitch Pt (mm/rev), of the feed axis 14 during a period when the feed axis operates from the target thread depth to a return completion position, from a command value provided in the tapping program P interpreted by the program interpreting section 24, and sends the total return-feed amount D0' and the thread pitch Pt as the feed axis command CF to the feed-axis control section 22. Usually, the total return-feed amount D0' is identical to the total feed amount D0.

The feed-motion control section 54 of the feed-axis control section 22 controls a return-feed motion of the feed axis 14, based on the rotational position FBS of return motion of the spindle axis 12, the thread pitch Pt and the feed position FBF of return motion of the feed axis 14. The residual feed-amount detecting section 56 of the feed-axis control section 22 detects a residual return-feed amount Dr' of the feed axis 14 during a period when the feed axis operates from the current position to the return completion position, based on the total return-feed amount D0' and the feed position FBF. The residual rotation-amount detecting section 34 of the spindle-axis control section 18 sequentially detects the residual return-rotation amount Sr' of the spindle axis 12 from the current position during a period when the spindle axis 12 is made to perform a return motion from the target thread depth to the return completion position, and notifies the residual return-rotation amount Sr' to the numerical control section 16 every time it is detected. The residual feed-amount detecting section 56 of the feed-axis control section 22 sequentially detects the residual return-feed amount Dr' of the feed axis 14 from the current position during a period when the feed axis 14 is made to perform a return-feed motion from the target thread depth to the return completion position, and notifies the residual return-feed amount Dr' to the numerical control section 16 every time it is detected. The synchronization error calculating section 62 of the numerical control section 16 calculates, with use of the residual return-rotation amount Sr' of the spindle axis 12, the residual return-feed amount Dr' of the feed axis 14 and the thread pitch Pt, the synchronization error E between the spindle axis 12 and the feed axis 14 (E=Sr'−Dr'/Pt or E=Sr'×Pt−Dr').

The configuration of the controller 10, 50, 60 can be described as a machine tool control method for controlling a synchronized operation of the spindle axis 12 and the feed axis 14. This control method includes the steps, executed by the controller 10, 50, 60, of:

obtaining, from a tapping program P, a total rotation amount S0 and a maximum rotation speed V0 of the spindle axis 12 during a period when the spindle axis operates from a process start position to a target thread depth;

making the spindle axis 12 perform an accelerated rotation at maximum capacity from the process start position, by a velocity control in which the maximum rotation speed V0 is set as a target value;

detecting a maximum acceleration A0 of the spindle axis 12 during the accelerated rotation at maximum capacity, based on a rotational position feedback FBS of the spindle axis 12;

detecting a residual rotation amount Sr of the spindle axis 12 during a period when the spindle axis operates from a current position to the target thread depth, based on the total rotation amount S0 and the rotational position feedback FBS;

detecting a current speed Vc of the spindle axis 12 based on the rotational position feedback FBS;

making the spindle axis 12 perform a decelerated rotation so as to reach a predetermined intermediate rotation speed Vi, by a velocity control, after the accelerated rotation at maximum capacity; and making the spindle axis 12 perform a decelerated rotation at maximum capacity so as to reach the target thread depth, by a position control, after the spindle axis 12 reaches the intermediate rotation speed Vi, based on the maximum acceleration A0, the residual rotation amount Sr and the current speed Vc;

wherein the step of making the spindle axis 12 reach the intermediate rotation speed Vi includes the step of successively updating a velocity command Cv for the decelerated rotation by the velocity control with use of the residual rotation amount Sr and the current speed Vc, and making the spindle axis 12 perform the decelerated rotation by the successively updated velocity command Cv so that the residual rotation amount Sr at an instant when the spindle axis 12 reaches the intermediate rotation speed Vi becomes equal to a positioning rotation amount Spos of the spindle axis 12 required for the spindle axis to reach the target thread depth under the position control.

The above control method also includes the steps, executed by the controller 10, 50, 60, of:

obtaining, from a tapping program P, a total return-rotation amount S0' and a maximum return-rotation speed V0' of the spindle axis 12 during a period when the spindle axis operates from a target thread depth to a return completion position;

making the spindle axis 12 perform an accelerated inverse rotation at maximum capacity from the target thread depth or from an initial return position at which the spindle axis has returned by a predetermined rotation number from the target thread depth, by a velocity control in which the maximum return-rotation speed V0' is set as a target value;

detecting or obtaining a maximum acceleration A0' of inverse rotation of the spindle axis 12 during a period when the spindle axis 12 performs the accelerated inverse rotation from the target thread depth;

detecting a residual return-rotation amount Sr' of the spindle axis 12 during a period when the spindle axis operates from a current position to the return completion position, based on the total return-rotation amount S0' and a rotational position feedback FBS of the spindle axis 12;

detecting a current speed Vc' of inverse rotation of the spindle axis 12 based on the rotational position feedback FBS;

making the spindle axis 12 perform a decelerated inverse rotation so as to reach a predetermined intermediate return-rotation speed Vi', by a velocity control, after the accelerated inverse rotation at maximum capacity; and making the spindle axis 12 perform a decelerated inverse rotation at maximum capacity and stop at the return completion position, by a position control, after the spindle axis 12 reaches the intermediate return-rotation speed Vi', based on the maximum acceleration A0' of inverse rotation, the residual return-rotation amount Sr' and the current speed Vc' of inverse rotation;

wherein the step of making the spindle axis 12 reach the intermediate rotation speed Vi' includes the step of successively updating a velocity command Cv' for the decelerated inverse rotation by the velocity control with use of the residual return-rotation amount Sr' and the current speed Vc' of inverse rotation, and making the spindle axis 12 perform the decelerated inverse rotation by the successively updated velocity command Cv' so that the residual return-rotation amount Sr' at an instant when the spindle axis 12 reaches the intermediate return-rotation speed Vi' becomes equal to a positioning return-rotation amount Spos' of the spindle axis 12 required for the spindle axis to stop at the return completion position under the position control.

According to the above control methods, effects corresponding to those achieved by the above-described controller 10, 50, 60 can be obtained.

While the invention has been described with reference to specific embodiments, it will be understood, by those skilled in the art, that various changes or modifications may be made thereto without departing from the scope of the following claims.

The invention claimed is:

1. A controller of a machine tool, configured to control a synchronized operation of a spindle axis and a feed axis, the controller comprising a hardware configured as:
    a numerical control section configured to prepare a spindle-axis command and a feed-axis command based on a tapping program;
    a spindle-axis control section configured to control a rotational motion of the spindle axis in accordance with the spindle-axis command;
    a rotation detecting section configured to detect a rotational position of the spindle axis;
    and a feed-axis control section configured to control a feed motion of the feed axis in accordance with the feed-axis command and based on the rotational position of the spindle axis;
    the numerical control section comprising:
    a spindle-axis command outputting section configured to obtain, from the tapping program, a total rotation amount and a maximum rotation speed of the spindle axis during a period when the spindle axis operates from a process start position to a target thread depth, and to send the total rotation amount and the maximum rotation speed as the spindle-axis command to the spindle-axis control section;
    the spindle-axis control section comprising:
    an initial-motion control section configured to make the spindle axis perform an accelerated rotation at maximum capacity using a maximum permissible current of a drive source from the process start position, by a velocity control in which the maximum rotation speed is set as a target value;
    a maximum-acceleration detecting section configured to detect a maximum acceleration of the spindle axis during the accelerated rotation at maximum capacity, based on the rotational position;
    a residual rotation-amount detecting section configured to detect a residual rotation amount of the spindle axis during a period when the spindle axis operates from a current position to the target thread depth, based on the total rotation amount and the rotational position;
    a current-speed detecting section configured to detect a current speed of the spindle axis based on the rotational position;
    a decelerating-motion control section configured to make the spindle axis perform a decelerated rotation so as to reach a predetermined intermediate rotation speed, by a velocity control, after the accelerated rotation at maximum capacity;
    and a positioning-motion control section configured to make the spindle axis perform a decelerated rotation at maximum deceleration corresponding to the maximum acceleration so as to reach the target thread depth, by a position control, after the spindle axis reaches the intermediate rotation speed, based on the maximum acceleration, the residual rotation amount and the current speed;
    wherein the decelerating-motion control section is configured to successively update a velocity command for the decelerated rotation by the velocity control with use of the residual rotation amount and the current speed, and to make the spindle axis perform the decelerated rotation by the successively updated velocity command so that the residual rotation amount at an instant when the spindle axis reaches the intermediate rotation speed becomes equal to a positioning rotation amount of the spindle axis required for the spindle axis to reach the target thread depth under the position control.

2. The controller of claim 1, wherein the spindle-axis command outputting section is configured to obtain, from the tapping program, a total return-rotation amount and a maximum return-rotation speed of the spindle axis during a period when the spindle axis operates from the target thread depth to a return completion position, and to send the total return-rotation amount and the maximum return-rotation speed as the spindle-axis command to the spindle-axis control section;
    wherein the initial-motion control section is configured to make the spindle axis perform an accelerated inverse rotation at maximum capacity using a maximum permissible current of a drive source from the target thread depth or from an initial return position at which the spindle axis has returned by a predetermined rotation number from the target thread depth, by a velocity control in which the maximum return-rotation speed is set as a target value;
    wherein the maximum-acceleration detecting section is configured to detect or obtain a maximum acceleration of inverse rotation of the spindle axis during a period when the spindle axis performs the accelerated inverse rotation from the target thread depth;
    wherein the residual rotation-amount detecting section is configured to detect a residual return-rotation amount of the spindle axis during a period when the spindle axis operates from a current position to the return completion position, based on the total return-rotation amount and the rotational position;
    wherein the current-speed detecting section is configured to detect a current speed of inverse rotation of the spindle axis based on the rotational position;
    wherein the decelerating-motion control section is configured to make the spindle axis perform a decelerated inverse rotation so as to reach a predetermined intermediate return-rotation speed, by a velocity control, after the accelerated inverse rotation at maximum capacity;

wherein the positioning-motion control section is configured to make the spindle axis perform a decelerated inverse rotation at maximum deceleration corresponding to the maximum acceleration of inverse rotation and stop at the return completion position, by a position control, after the spindle axis reaches the intermediate return-rotation speed, based on the maximum acceleration of inverse rotation, the residual return-rotation amount and the current speed of inverse rotation; and wherein the decelerating-motion control section is configured to successively update a velocity command for the decelerated inverse rotation by the velocity control with use of the residual return-rotation amount and the current speed of inverse rotation, and to make the spindle axis perform the decelerated inverse rotation by the successively updated velocity command so that the residual return-rotation amount at an instant when the spindle axis reaches the intermediate return-rotation speed becomes equal to a positioning return-rotation amount of the spindle axis required for the spindle axis to stop at the return completion position under the position control.

3. The controller of claim 2, wherein the positioning-motion control section is configured to make the spindle axis stop at the target thread depth;
wherein the initial-motion control section is configured to make the spindle axis perform the accelerated inverse rotation at the maximum capacity from the target thread depth; and
wherein the maximum-acceleration detecting section is configured to detect the maximum acceleration of inverse rotation during the accelerated inverse rotation at maximum capacity, based on the rotational position.

4. The controller of claim 2, wherein the positioning-motion control section is configured not to make the spindle axis stop at the target thread depth but to make the spindle axis perform an accelerated inverse rotation at the maximum acceleration of inverse rotation, which is identical to a maximum deceleration during the decelerated rotation at maximum capacity, to the initial return position by the position control, after the spindle axis reaches the target thread depth;
wherein the initial-motion control section is configured to make the spindle axis perform the accelerated inverse rotation at the maximum capacity from the initial return position; and
wherein the maximum-acceleration detecting section is configured to obtain the maximum deceleration as the maximum acceleration of inverse rotation.

5. The controller of claim 2, wherein the numerical control section is configured to monitor the residual rotation amount and to judge that a tapping process reaches the target thread depth when the residual rotation amount becomes equal to or less than a first predetermined value.

6. The controller of claim 2, wherein the numerical control section is configured to monitor the residual return-rotation amount and to judge that a return motion is completed when the residual return-rotation amount becomes equal to or less than a second predetermined value.

7. The controller of claim 2, further comprising a feed detecting section configured to detect a feed position of the feed axis;
wherein the numerical control section comprises:
a feed-axis command outputting section configured to obtain, from the tapping program, a total return-feed amount and a thread pitch of the feed axis during a period when the feed axis operates from the target thread depth to the return completion position, and to send the total return-feed amount and the thread pitch as the feed-axis command to the feed-axis control section, when the numerical control section judges that the tapping process reaches the target thread depth; and
wherein the feed-axis control section comprises:
a feed-motion control section configured to control a return-feed motion of the feed axis, based on the thread pitch and the rotational position; and
a residual feed-amount detecting section configured to detect a residual return-feed amount of the feed axis during a period when the feed axis operates from a current position to the return completion position, based on the total return-feed amount and the feed position.

8. The controller of claim 7, wherein the numerical control section comprises a position recognizing section configured to recognize the current position of the spindle axis based on the residual return-rotation amount, and also recognize the current position of the feed axis based on the residual return-feed amount.

9. The controller of claim 7, wherein the numerical control section comprises a synchronization-error calculating section configured to calculate a synchronization error in the synchronized operation, based on the residual return-rotation amount, the residual return-feed amount and thread pitch.

10. The controller of claim 1, further comprising a feed detecting section configured to detect a feed position of the feed axis;
wherein the numerical control section comprises:
a feed-axis command outputting section configured to obtain, from the tapping program, a total feed amount and a thread pitch of the feed axis during a period when the feed axis operates from the process start position to the target thread depth, and to send the total feed amount and the thread pitch as the feed-axis command to the feed-axis control section; and
wherein the feed-axis control section comprises:
a feed-motion control section configured to control the feed motion of the feed axis, based on the thread pitch and the rotational position; and
a residual feed-amount detecting section configured to detect a residual feed amount of the feed axis during a period when the feed axis operates from a current position to the target thread depth, based on the total feed amount and the feed position.

11. The controller of claim 10, wherein the numerical control section comprises a position recognizing section configured to recognize the current position of the spindle axis based on the residual rotation amount, and also recognize the current position of the feed axis based on the residual feed amount.

12. The controller of claim 10, wherein the numerical control section comprises a synchronization-error calculating section configured to calculate a synchronization error in the synchronized operation, based on the residual rotation amount, the residual feed amount and the thread pitch.

13. A controller of a machine tool, configured to control a synchronized operation of a spindle axis and a feed axis, the controller comprising a hardware processor configured as:
a numerical control section configured to prepare a spindle-axis command and a feed-axis command based on a tapping program;

a spindle-axis control section configured to control a rotational motion of the spindle axis in accordance with the spindle-axis command;
a rotation detecting section configured to detect a rotational position of the spindle axis;
and a feed-axis control section configured to control a feed motion of the feed axis in accordance with the feed-axis command and based on the rotational position of the spindle axis;
the numerical control section comprising:
a spindle-axis command outputting section configured to obtain, from the tapping program, a total return-rotation amount and a maximum return-rotation speed of the spindle axis during a period when the spindle axis operates from a target thread depth to a return completion position, and to send the total return-rotation amount and the maximum return-rotation speed as the spindle-axis command to the spindle-axis control section;
the spindle-axis control section comprising:
an initial-motion control section configured to make the spindle axis perform an accelerated inverse rotation at maximum capacity using a maximum permissible current of a drive source from the target thread depth or from an initial return position at which the spindle axis has returned by a predetermined rotation number from the target thread depth, by a velocity control in which the maximum return-rotation speed is set as a target value;
a maximum-acceleration detecting section configured to detect or obtain a maximum acceleration of inverse rotation of the spindle axis during a period when the spindle axis performs the accelerated inverse rotation from the target thread depth;
a residual rotation-amount detecting section configured to detect a residual return-rotation amount of the spindle axis during a period when the spindle axis operates from a current position to the return completion position, based on the total return-rotation amount and the rotational position;
a current-speed detecting section configured to detect a current speed of inverse rotation of the spindle axis based on the rotational position;
a decelerating-motion control section configured to make the spindle axis perform a decelerated inverse rotation so as to reach a predetermined intermediate return-rotation speed, by a velocity control, after the accelerated inverse rotation at maximum capacity;
and a positioning-motion control section configured to make the spindle axis perform a decelerated inverse rotation at maximum deceleration corresponding to the maximum acceleration of inverse rotation and stop at the return completion position, by a position control, after the spindle axis reaches the intermediate return-rotation speed, based on the maximum acceleration of inverse rotation, the residual return-rotation amount and the current speed of inverse rotation;
wherein the decelerating-motion control section is configured to successively update a velocity command for the decelerated inverse rotation by the velocity control with use of the residual return-rotation amount and the current speed of inverse rotation, and to make the spindle axis perform the decelerated inverse rotation by the successively updated velocity command so that the residual return-rotation amount at an instant when the spindle axis reaches the intermediate return-rotation speed becomes equal to a positioning return-rotation amount of the spindle axis required for the spindle axis to stop at the return completion position under the position control.

14. A method of controlling a machine tool, configured to control a synchronized operation of a spindle axis and a feed axis, the method comprising the steps, executed by a controller, of:
obtaining, from a tapping program, a total rotation amount and a maximum rotation speed of the spindle axis during a period when the spindle axis operates from a process start position to a target thread depth;
making the spindle axis perform an accelerated rotation at maximum capacity using a maximum permissible current of a drive source from the process start position, by a velocity control in which the maximum rotation speed is set as a target value;
detecting a maximum acceleration of the spindle axis during the accelerated rotation at maximum capacity, based on a rotational position feedback of the spindle axis;
detecting a residual rotation amount of the spindle axis during a period when the spindle axis operates from a current position to the target thread depth, based on the total rotation amount and the rotational position feedback;
detecting a current speed of the spindle axis based on the rotational position feedback;
making the spindle axis perform a decelerated rotation so as to reach a predetermined intermediate rotation speed, by a velocity control, after the accelerated rotation at maximum capacity;
and making the spindle axis perform a decelerated rotation at maximum deceleration corresponding to the maximum acceleration so as to reach the target thread depth, by a position control, after the spindle axis reaches the intermediate rotation speed, based on the maximum acceleration, the residual rotation amount and the current speed;
wherein the step of making the spindle axis reach the intermediate rotation speed includes the step of successively updating a velocity command for the decelerated rotation by the velocity control with use of the residual rotation amount and the current speed, and making the spindle axis perform the decelerated rotation by the successively updated velocity command so that the residual rotation amount at an instant when the spindle axis reaches the intermediate rotation speed becomes equal to a positioning rotation amount of the spindle axis required for the spindle axis to reach the target thread depth under the position control, and
wherein the method further comprises the steps, executed by the controller, of:
preparing a feed-axis command based on the tapping program; and
controlling a feed motion of the feed axis in accordance with the feed-axis command and based on the rotational position feedback of the spindle axis.

15. A method of controlling a machine tool, configured to control a synchronized operation of a spindle axis and a feed axis, the method comprising the steps, executed by a controller, of:
obtaining, from a tapping program, a total return-rotation amount and a maximum return-rotation speed of the spindle axis during a period when the spindle axis operates from a target thread depth to a return completion position;

making the spindle axis perform an accelerated inverse rotation at maximum capacity using a maximum permissible current of a drive source from the target thread depth or from an initial return position at which the spindle axis has returned by a predetermined rotation number from the target thread depth, by a velocity control in which the maximum return-rotation speed is set as a target value;

detecting or obtaining a maximum acceleration of inverse rotation of the spindle axis during a period when the spindle axis performs the accelerated inverse rotation from the target thread depth;

detecting a residual return-rotation amount of the spindle axis during a period when the spindle axis operates from a current position to the return completion position, based on the total return-rotation amount and a rotational position feedback of the spindle axis;

detecting a current speed of inverse rotation of the spindle axis based on the rotational position feedback;

making the spindle axis perform a decelerated inverse rotation so as to reach a predetermined intermediate return-rotation speed, by a velocity control, after the accelerated inverse rotation at maximum capacity;

and making the spindle axis perform a decelerated inverse rotation at maximum deceleration corresponding to the maximum acceleration of inverse rotation and stop at the return completion position, by a position control, after the spindle axis reaches the intermediate return-rotation speed, based on the maximum acceleration of inverse rotation, the residual return-rotation amount and the current speed of inverse rotation;

wherein the step of making the spindle axis reach the intermediate rotation speed includes the step of successively updating a velocity command for the decelerated inverse rotation by the velocity control with use of the residual return-rotation amount and the current speed of inverse rotation, and making the spindle axis perform the decelerated inverse rotation by the successively updated velocity command so that the residual return-rotation amount at an instant when the spindle axis reaches the intermediate return-rotation speed becomes equal to a positioning return-rotation amount of the spindle axis required for the spindle axis to stop at the return completion position under the position control, and wherein the method further comprises the steps, executed by the controller, of:

preparing a feed-axis command based on the tapping program; and controlling a feed motion of the feed axis in accordance with the feed-axis command and based on the rotational position feedback of the spindle axis.

* * * * *